United States Patent
Forrest

(10) Patent No.: US 8,028,683 B1
(45) Date of Patent: Oct. 4, 2011

(54) MULTIFUEL SUPPLY SYSTEM

(75) Inventor: Kevin Forrest, Albuquerque, NM (US)

(73) Assignee: Plant Oil Powered Diesel Fuel Systems, Inc., Santa Fe, NM (US)

( * ) Notice: Subject to any disclaimer, the term of this patent is extended or adjusted under 35 U.S.C. 154(b) by 350 days.

(21) Appl. No.: 12/399,420

(22) Filed: Mar. 6, 2009

Related U.S. Application Data

(63) Continuation-in-part of application No. 12/254,791, filed on Oct. 20, 2008, now abandoned.

(60) Provisional application No. 61/075,271, filed on Jun. 24, 2008, provisional application No. 60/981,497, filed on Oct. 20, 2007.

(51) Int. Cl.
*F02B 13/00* (2006.01)
*F02B 13/10* (2006.01)

(52) U.S. Cl. ........ 123/575; 123/543

(58) Field of Classification Search .......... 123/575, 123/576, 577, 578, 299, 304, 1 A, 543, 544, 123/549, 557
See application file for complete search history.

(56) References Cited

U.S. PATENT DOCUMENTS

| | | | | |
|---|---|---|---|---|
| 5,357,908 A * | 10/1994 | Sung et al. | ........................ | 123/3 |
| 2006/0081230 A1* | 4/2006 | Kangler | ........................ | 123/575 |
| 2007/0056569 A1* | 3/2007 | Kleinberger | ................... | 123/547 |
| 2007/0240687 A1* | 10/2007 | Payne et al. | ..................... | 123/510 |
| 2008/0163854 A1* | 7/2008 | Karner | ........................... | 123/543 |
| 2008/0245350 A1* | 10/2008 | Triska | ........................... | 123/575 |
| 2009/0314262 A1* | 12/2009 | Sellentin | ....................... | 123/557 |

OTHER PUBLICATIONS

BWI Equipment, "BWI Process Separates Trash and Oil from Water", www.bwiequipment.com.
BWI Equipment, "The Problem with Grease Trap Waste", www.bwiequipment.com.

* cited by examiner

*Primary Examiner* — Mahmoud Gimie
(74) *Attorney, Agent, or Firm* — Birch, Stewart, Kolasch & Birch, LLP

(57) ABSTRACT

A system for connecting a supply of alternative oil to a diesel engine which uses heated engine coolant and electric heat to prevent engine line restriction due to gelled alternative oil.

29 Claims, 19 Drawing Sheets

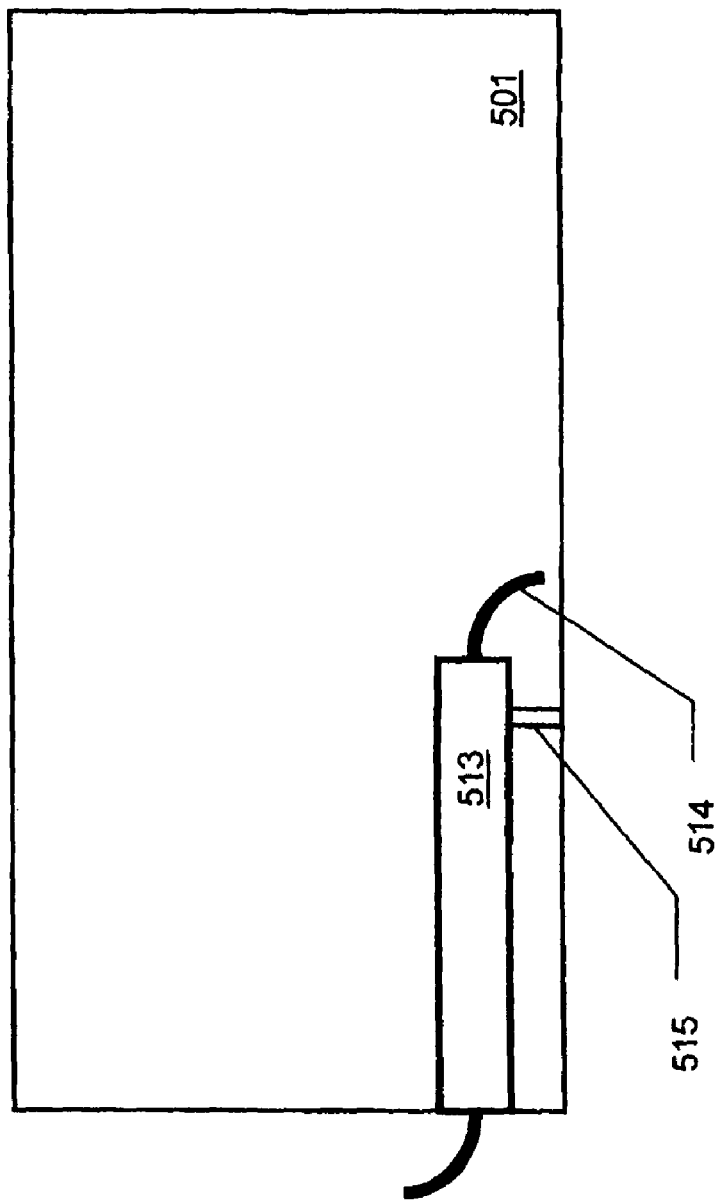

MULTIFUEL SUPPLY SYSTEM

CROSS-REFERENCE TO RELATED APPLICATIONS

This application is a continuation-in-part application of U.S. patent application Ser. No. 12/254,791, entitled "Multifuel Supply System", field on Oct. 20, 2008 now abandoned, which claims priority to and the benefit of the filing of U.S. Provisional Patent Application Ser. No. 61/075,271, entitled "Multifuel Capabilities for Compression Combustion Engines", filed on Jun. 24, 2008; and U.S. Provisional Patent Application Ser. No. 60/981,497, entitled "Alternative Fuel Production and Engine Systems", filed Oct. 20, 2007, and the specifications and claims thereof are incorporated herein by reference. This application is also related to a patent application entitled Fuel Processing System filed on even date herewith, and the specification and claims thereof are incorporated herein by reference.

BACKGROUND OF THE INVENTION

1. Field of the Invention (Technical Field)

Embodiments of the present invention relate to the field of compression combustion engines, such as those commonly operated on petrochemical diesel fuel, and more specifically to systems providing the capability to operate such engines on multiple fuels, for example alternative fuels derived from vegetable oils and/or animal fats and/or oils, or combinations of the foregoing.

2. Description of Related Art

Note that the following discussion refers to a publication and that due to a recent publication date, certain publications are not to be considered as prior art vis-à-vis the present invention, discussion of such publication herein is given for more complete background and is not to be construed as an admission that such publication is prior art for patentability determination purposes.

U.S. Patent Publication Number 2008/0163864, to Karner, describes a fuel system for diesel engines which also burn vegetable oil. Karner, however, generates heat to keep the fuel from gelling with electric heaters and does not use the heat generated by the engine, which heat must be dissipated anyway. Karner's system, which has numerous un-heated parts, can operate only with vegetable oil that is liquid at an ambient temperature and cannot operate with alternative oil such as waste grease or hydrogenated or high fat vegetable oils. Karner does mention using engine coolant as an option, but teaches to use the heat from heated engine coolant only to heat the tank.

A diesel engine, sometimes referred to herein as a compression combustion engine to avoid confusion with the petrochemical fuel commonly called diesel, is an internal combustion engine that uses compression ignition, in which fuel ignites as it is injected into air in the combustion chamber that has been compressed to temperatures high enough to cause ignition. Such engines operate using the Diesel cycle named after a German engineer, Rudolf Diesel, who invented it in 1892 based on the hot bulb engine and for which he received a patent on Feb. 23, 1893. Diesel had earlier experimented with the use of coal dust as a fuel in a similar design of engine. At the request of the French Government the Otto company demonstrated the diesel engine at the 1900 Exposition Universelle (World's Fair) using peanut oil. The French government was looking at using peanut oil for a locally produced fuel in their African colonies. Diesel later extensively tested the use of plant oils in his engine and began to actively promote the use of these fuels.

In a typical diesel engine, air is drawn into the cylinders and is compressed by pistons at compression ratios as high as 25:1, much higher than commonly used for spark-ignite engines. Near the end of the compression stroke, fuel is injected into the combustion chamber through an injector (or atomizer). The fuel ignites from contact with the air that, due to compression, has been heated to a temperature of about 700-900° C. (1300-1650° F.). The resulting combustion causes increased heat and expansion in the cylinder which increases pressure and moves the piston downward. A connecting rod transmits this motion to a crankshaft to convert linear motion to rotary motion for use as power in a variety of applications. Intake air to the engine is typically controlled by mechanical valves in the cylinder head.

In cold weather, diesel engines can be difficult to start because the cold metal of the cylinder block and head draw out the heat created in the cylinder during the compression stroke, thus preventing ignition. Some diesel engines use small electric heaters called glow plugs inside the cylinder to help ignite fuel when starting. Some even use resistive grid heaters in the intake manifold to warm the inlet air until the engine reaches operating temperature. Engine block heaters (electric resistive heaters in the engine block) connected to the utility grid are often used when an engine is turned off for extended periods (more than an hour) in cold weather to enable a quicker startup time. Petrochemical diesel fuel is also prone to 'waxing' in cold weather, a term for the solidification of diesel oil into a crystalline state. The crystals build up in the fuel (especially in fuel filters), eventually starving the engine of fuel. Low-output electric heaters in fuel tanks and around fuel lines are used to solve this problem. Most modern diesel engines include filter heaters to de-gel diesel fuel. Diesel typically gels at about −20° F., and the aftermarket has supplied heated filters for extremely cold applications for years. Also, most engines have a 'spill return' system, by which any excess fuel from the injector pump and injectors is returned to the fuel tank. Once the engine has warmed, returning warm fuel prevents waxing in the tank. This spill return system also cools the diesel fuel when the weather is hot as heat is dissipated through the tank walls by convection. Fuel technology has improved recently so that with special additives, waxing no longer occurs in all but the coldest climates.

Typically, a mechanical injector system vaporizes the fuel. This forced vaporization means that less volatile fuels can be used. More crucially, because only air is inducted into the cylinder in a diesel engine, the compression ratio can be very high as there is no risk of pre-ignition provided the injection process is accurately timed. This means that cylinder temperatures are much higher in a diesel engine than a petrol engine, allowing less combustible fuels to be used. Some large marine diesels (often called cathedral engines due to their size) run on heavy fuel oil (sometimes called "bunker oil"), which is a thick, viscous and almost un-flammable fuel that is very safe to store and cheap to buy in bulk as it is a waste product from the petroleum refining industry. The fuel must be heated to thin it out (often by the exhaust header) and is often passed through multiple injection stages to vaporize it.

Another alternative to petrochemical diesel fuel is vegetable oil. Vegetable oil has any desirable characteristics compared with petrochemical diesel fuel; as examples, it is from renewable sources, it potentially produces less hazardous emissions, and it can be produced by recycling waste products. Effective and convenient operation of diesel engines on vegetable oil, however, has not been achieved due to the many differences between vegetable oil and petrochemical diesel.

As an example, vegetable ell solidifies at much higher temperatures than petrochemical diesel, so starting a diesel engine with vegetable oil in even mildly-cold weather is generally impractical. As another example, vegetable oil can leave deposits in fuel lines, cylinders, piston ring, and lube oil that eventually compromises the performance of the engine.

Accordingly, there is a need for systems and methods that allow diesel engines to be operated practically and efficiently on alternative oils such as vegetable oils, animal fats and oils, waste grease, and combinations of the foregoing.

BRIEF SUMMARY OF THE INVENTION

An embodiment of the present invention relates to a method for supplying alternative oil to an engine which includes providing an alternative oil storage tank, providing an alternative oil heated filter, selecting the alternative oil using a selector valve, and positioning a fuel pump and drawing the alternative oil through the filter with the fuel pump and not pushing the alternative oil through the filter. The method can also include thermally insulating the storage tank; and not returning the alternative oil to the storage tank when the engine is operating on alternative oil only, and/or connecting a heated flow line between the heated filter and the storage tank.

In one embodiment, the fuel pump can be a single fuel pump and the pump can selectively pump petrochemical diesel or alternative oil to the engine. Optionally, a temperature sensor can obtain a temperature reading of engine coolant which is returning to the engine from heating one or more heated alternative oil components. Preferably, petrochemical diesel from a diesel tank does not flow through the filter. The method can also include providing a time delay prior to engine shut down, and during the time delay, petrochemical diesel can replace alternative oil in at least one fuel line. Optionally, a time delay can be provided which can occur prior to switching from the alternative oil supply to a petrochemical diesel fuel supply. Engine coolant lines can also be disposed within a portion of the filter. In one embodiment, at least a portion of the coolant lines which are disposed within a portion of the filter can have a greater cross-sectional area than that of supply coolant lines which connect to the filter. Optionally, a heater can be provided in the storage tank and the heater can optionally be longitudinally orientated in the storage tank.

In the method, supplying alternative oil to an engine can include selecting the alternative oil using a heated selector valve. Heating for the selector valve can be provided by engine coolant which has been heated by the engine. The method can also include heating and filtering the alternative oil using a heated filter disposed in fluid communication with the storage tank.

An embodiment of the present invention also relates to a compression-combustion fuel supply system which includes a petrochemical fuel supply system, an alternative oil storage tank that has a heated pickup, a heated alternative oil filter, and a pump configured such that ii can be used to selectively pump either petrochemical fuel or alternative oil. In one embodiment, the system includes a fuel cooling heat exchanger.

An embodiment of the present invention also relates to a fuel supply system which includes a multifuel storage tank, a petrochemical storage tank, a heated valve assembly for selectively switching between fuel stored in the multifuel and the petrochemical storage tanks, and a fuel cooling heat exchanger. The system can also include a maximum fuel temperature sensor and/or first and second heated engine coolant loops. Optionally, petrochemical fuel can be stored in the multifuel storage tank. In addition, one of the heated engine coolant loops can include a three-way valve, which can optionally cause heated engine coolant to bypass a substantial portion of one of the fuel loops. The fuel supply system can also include a three-way valve which can selectively send heated fuel through either the cooling heat exchanger or which causes fuel to bypass the cooling heat exchanger.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 5a and 5b are schematic illustrations of a fuel tank according to an embodiment of the present invention;

DETAILED DESCRIPTION OF THE INVENTION

Embodiments of the present invention comprise methods and apparatuses that provide for practical and efficient operation of diesel engines using alternative oils such as oils and/or greases from plants and/or animals, including but net limited to trap grease, brown grease, yellow grease, and/or virgin (unused) vegetable oil, as fuel.

As used throughout the specification and claims of the instant application, the term "alternative oil" is intended to include all non-petrochemical fuels, including but not limited to vegetable oils, oils and/or fats obtained and/or rendered from animals, including, but not limited to the grease collected in traps at restaurants. The term "alternative oil" can also optionally include bio-diesels of 100% blends (B-100), 50% (B-50) or more blends, 25% (B-25) or more blends, 6% or more blends (B-6), 4% (B-4) or more blends, and/or 2% (B-2) or more blend. Specifically, some embodiments of the invention do not comprise any biodiesel, or do not comprise bio diesel of about 2% (B-2) or less; 4% (B-4) or less; 6% (B-6) or less; 25% (B-25) or less; and/or 50% (B-50) or less. The term "valve" and/or "valves" is intended to mean and include any type of fuel flow apparatus, method, device, system, and/or combination thereof. In addition, the terms "drawing", "sucking", and "vacuum" are used interchangeably and the definition of each is intended to encompass each of the other terms.

Figure 1:
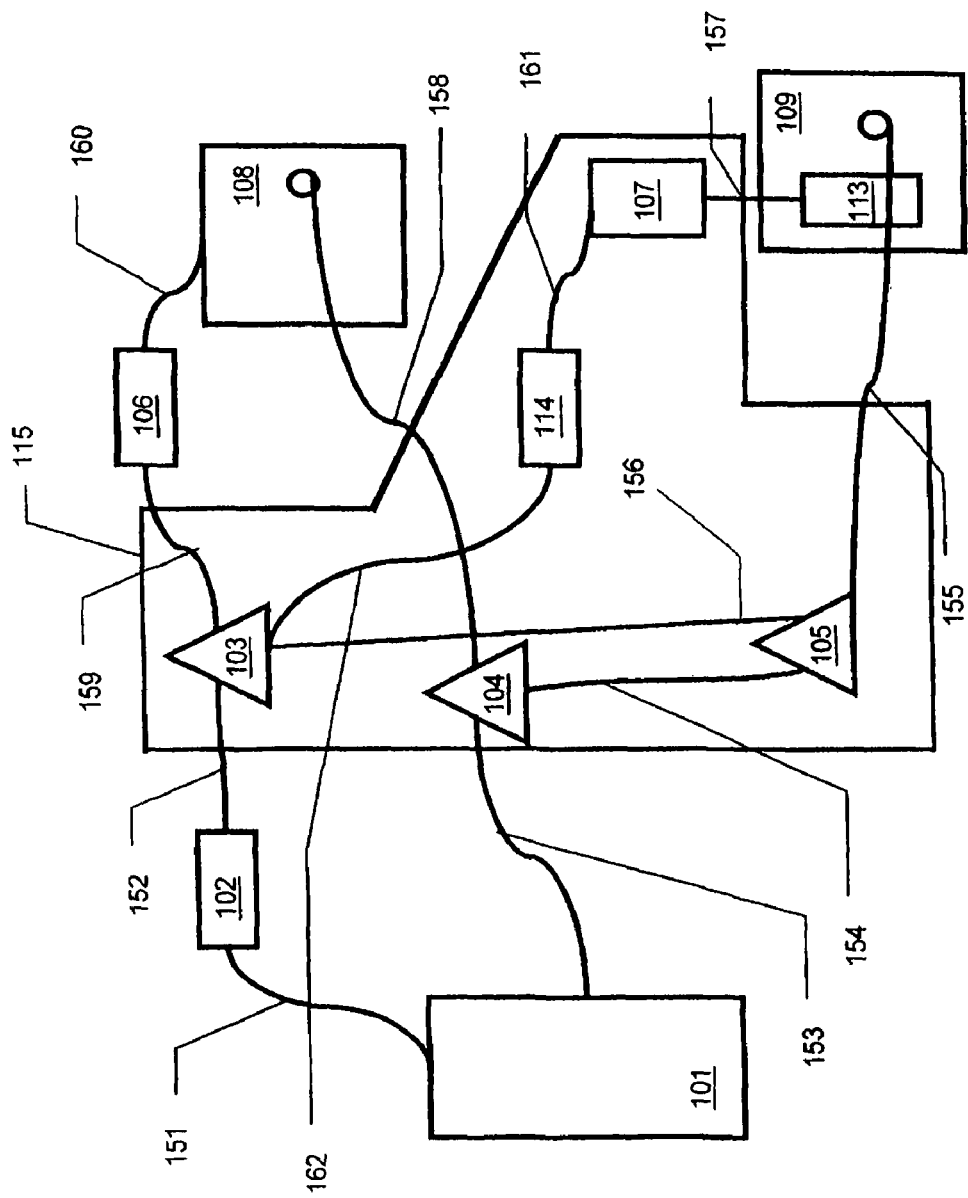
FIG. 1 is a schematic illustration of a diesel engine system according to an embodiment of the present invention configured to operate on petrochemical diesel and on alternative oil.

FIG. 1 is a schematic illustration of a diesel engine system according to an embodiment of the present invention configured to operate on petrochemical diesel and on alternative oil. The system preferably comprises diesel engine 101, petrochemical diesel fuel tank 108, alternative oil tank 109, first fuel heater 102, second fuel heater 107, first filter 106, heated filter 114, heated fuel pickup 113, first valve 103, second valve 104, and third valve 105. The fuel input of diesel engine 101 is preferably in fluid communication with first fuel heater 102, which in turn is preferably in fluid communication with first valve 103. First valve 103 is preferably in fluid communication with first filter 106 and heated filter 114. First filter 106 is preferably in fluid communication with petrochemical diesel fuel tank 108. Heated filter 114 is preferably in fluid communication with second fuel heater 107. Second fuel heater 107 is preferably in fluid communication with heated pickup 113 in alternative oil tank 109. The fuel return port of diesel engine 101 is preferably in fluid communication with second valve 104. Second valve 104 is preferably in fluid communication with the third valve 105 and a fuel return port of petrochemical diesel fuel tank 108. Third valve 105 is also preferably in fluid communication with a fuel return port of alternative oil tank 109. Third valve 105 is also preferably in fluid communication with first valve 103. Various components common to diesel engines (e.g., fuel pumps, filters, control systems) are not shown in the figure for ease of illustration.

Figure 2A:
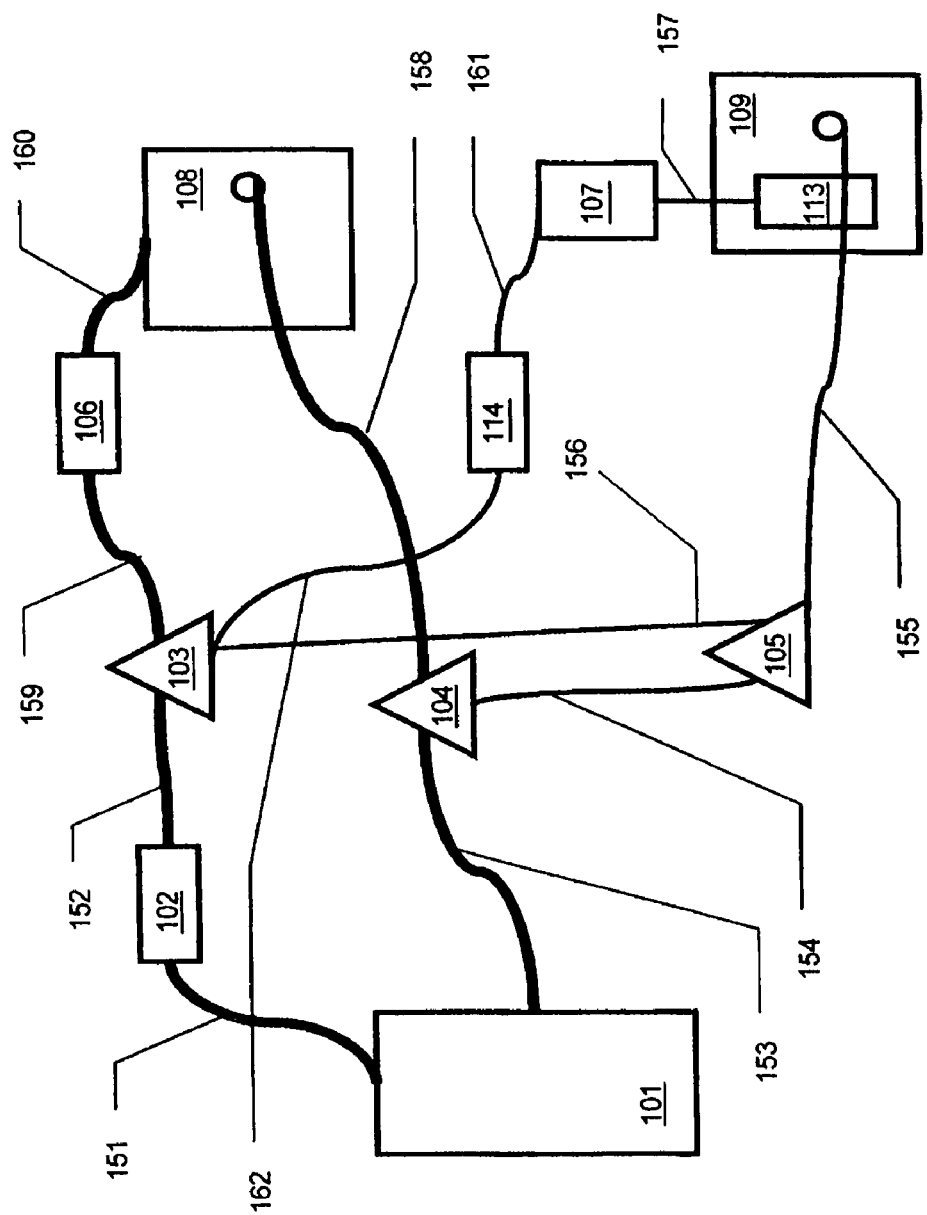
FIGS. 2a-2c are schematic depictions of various modes of operation of the embodiment of the present invention system in FIG. 1.

The operation of the example system illustrated in FIG. 1 can be considered as comprising several modes of operation. In a "diesel-only" mode, the diesel engine is preferably operating on petrochemical diesel fuel only. FIG. 2a is a schematic illustration of the fuel paths operative in this mode of operation. In this embodiment, first valve 103 is preferably configured to connect fuel line 159 and fuel line 152, second valve 104 is configured to connect fuel line 153 and fuel line 158. Fuel is preferably drawn from petrochemical diesel tank 108 to the input post of diesel engine 101 through fuel line 160, first filter 106, fuel line 159, first valve 103, teeniest 152, first fuel heater 102, and fuel line 151. The fuel lines can comprise any apparatus and/or method by which fuel can be transmitted between the corresponding components of the system, including but not limited to direct connection of the elements, or conventional hoses and/or tubing. Return fuel from diesel engine 101 is preferably delivered to petrochemical diesel fuel tank 108 through fuel line 153, second valve 104, and fuel line 158. In this mode of operation, the fuel system and diesel engine preferably operate in a manner very similar to contemporary diesel engines.

Figure 2B:
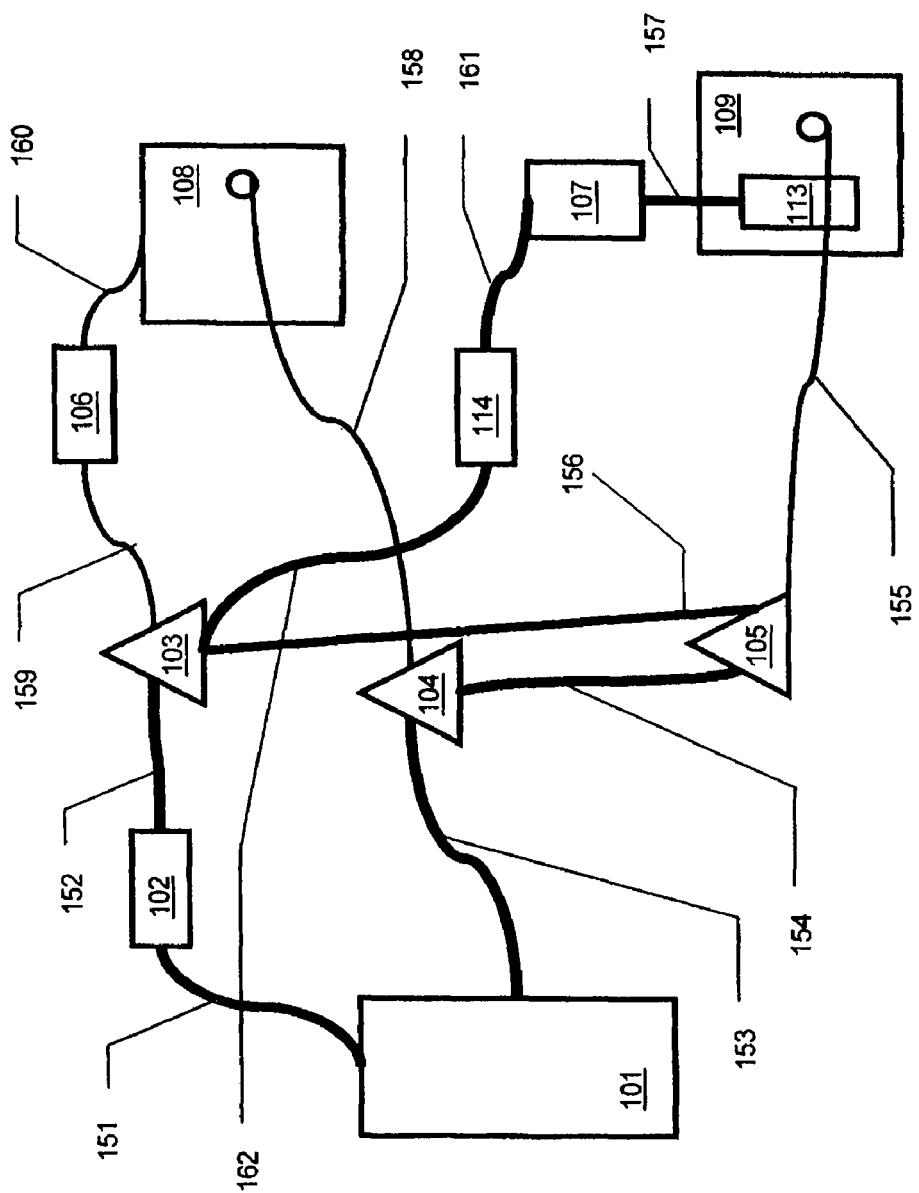

In an "alternative-oil-only" mode of operation, diesel engine 101 is operating on alternative oil only. FIG. 2b is a schematic illustration of the fuel paths operative in this mode of operation. First valve 103 is preferably configured to connect fuel line 162 and fuel line 152. Second valve 104 is preferably configured to connect fuel line 153 and fuel line 154. Third valve 105 is preferably configured to connect fuel line 154 and fuel line 155. Alternative oil is preferably drawn from alternative oil tank 109 to diesel engine 101 through heated pickup 113, second fuel heater 107, heated filter 114, first valve 103, and fuel heater 102. Fuel returned from diesel engine 101 is preferably recycled directly to the fuel input path of the diesel engine through second valve 104, and third valve 105. In this mode of operation, diesel engine 101 is preferably operating exclusively on alternative oil. The direct recycling of return fuel to the fuel input preferably conserves the heat needed to keep the alternative all suitable for the diesel engine, and avoids the need to heat the entire contents of alternative oil tank 109 to full engine operating temperature. This also reduces fuel pump workload.

Figure 2C:
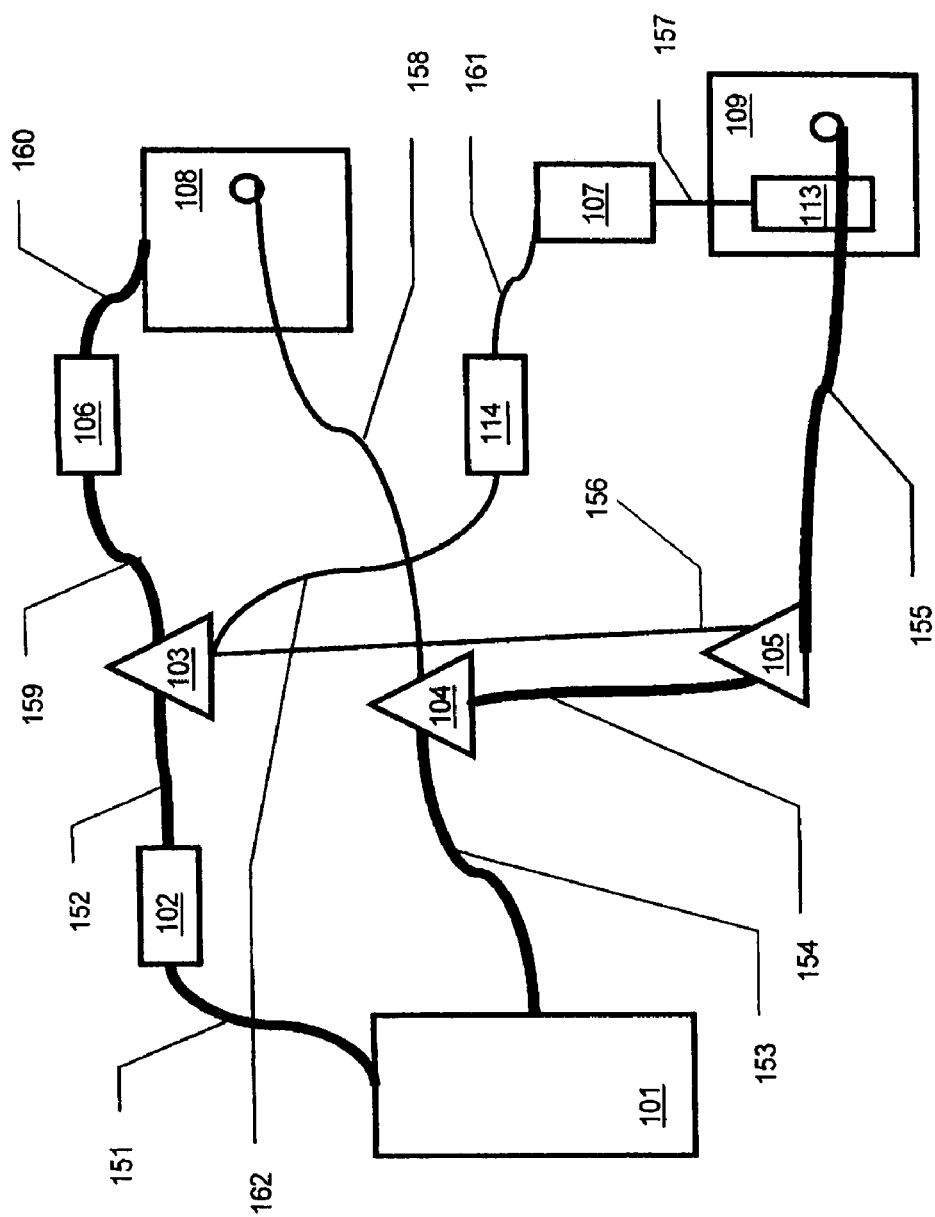

In a "purge" mode of operation, diesel engine 101 is preferably operating on a mixture of petrochemical diesel and alternative ell, while substantially all alternative oil in the system is burned or returned to alternative oil tank 109, thus avoiding the difficulties of later attempting to start the engine cold with alternative oil in the fuel input (e.g., the alternative oil can congeal or solidify, making starting difficult and/or impossible). FIG. 2c is a schematic illustration of the fuel paths operative in this mode of operation. First valve 103 is preferably configured to connect fuel line 159 and fuel line 152. Second valve 104 is preferably configured to connect fuel line 153 and fuel line 154. Third valve 105 is preferably configured to connect fuel line 154 and fuel line 155. Fuel is preferably supplied to diesel engine 101 from petrochemical diesel fuel tank 108 as in the "diesel-only" mode of operation. Return fuel from diesel engine 101 is preferably returned to alternative oil tank 109 through second valve 104 and third valve 105. The alternative oil in the engine is thus quickly purged from diesel engine 101 and the fuel input parts of the system. Some petrochemical diesel can also be sent to alternative oil tank 109 in the "purge" mode of operation. In an example cycle of the system, the system begins in the diesel-only mode of operation for cold starting. Diesel engine 101 starts on petrochemical diesel as in contemporary diesel engine systems. As diesel engine 101 operates, it generates heat and also optionally drives an electrical generator. The engine heat, or electrical heaters powered by the generator or another source, can optionally be used to heat second fuel heater 107, heated filter 114, heated pickup 113, and valves 103, 104, and 105 (together the "alternative oil heaters"). If electrical power or another heat source is available while diesel engine 101 is not operating (e.g., a plug-in engine heater) any of the alternative oil heaters can be heated to reduce the time required in the diesel-only mode of operation. The various fuel lines that transport alternative oil can also optionally be heated by electrical heating elements or by diesel engine 101 (e.g., by placing the fuel lines in proximity to engine coolant lines).

Once the alternative oil heaters have brought the alternative oil portions of the system to an appropriate operating temperature, the system can optionally be switched to the alternative-elf-only mode of operation. First fuel heater 102 can also be preheated before switching to alternative-elf-only operation to ensure that the alternative oil reaching diesel engine 101 is maintained at a suitable temperature. The determination of when the operating temperature has been reached can be made in various ways, including but not limited to: time since cold start, an engine temperature sensor, a coolant temperature sensor, one or more temperature sensors in the alternative oil portion of the system, one or more coolant temperature sensors on coolant return lines from the coolant-heated portions of the alternative oil portion of the system, or combinations thereof. The direct recycling of fuel in the alternative-oil-only operation preferably makes the input fuel mostly petrochemical diesel as the alternative-oil-only mode is initiated. This can help keep input fuel viscosity down while various system components (e.g., fuel lines, valves) reach full operating temperature. In one embodiment, as the recycled fuel is consumed, the fuel input to diesel engine 101 gradually becomes at least substantially alternative oil.

The system can then receive an indication that it is desired to stop operation of the alternative oil system, for example by an operator commanding a shut down (including but not limited to turning off the key in a contemporary vehicle); or by an indication that alternative oil tank 109 is running out of fuel; or by an indication that some portion of the alternative oil portion of the system is no longer at an appropriate operating temperature; or by an indication that the fuel pressure is no longer within parameters; or by a periodically scheduled switch to petrochemical diesel if desired to discourage sclerosis in the fuel lines that can occur with alternative oil during extended operation. The system can then optionally enter the purge mode of operation, removing the alternative oil from diesel engine 101 and the fuel input portion of the system. In one embodiment, if the indication was a commanded shut down, the engine operation can be ceased after the alternative oil has been purged (e.g., by fuel composition sensors, by fuel flow sensors, or by operating in the purge mode for a predetermined time).

The system can receive an indication by a computer processor that it is desired to stop operation of the alternative oil system and switch to petrochemical only mode of operation because the engine has been idling with no load on the engine for more than a predetermined time (for example, 5 minutes, 3 minutes, 1 minute, 30 seconds, or some other amount of time). This indication and the resulting switch from alternative oil to petrodiesel fuel can be used to avoid the problem of "wet-stacking", which is explained as follows. Diesel engines operate best with a load. When a diesel engine operates considerably below the rated output level for a period of time, the engine can start to over-fuel or "wet stack". Diesel engines perform most efficiently in the 70-80 percent range of rated output. When a diesel engine operates for a prolonged period of time below 40 percent of the rated output, it begins to over-fuel. "Wet stacking" occurs because the injection tips begin to carbonize and disrupt the fuel spray pattern. The glycerin in alternative oil often makes wet stacking more pronounced with alternative oil than petrochemical diesel fuel, which does not contain glycerin. Thus, a sensor of constant engine speed at no load will indicate idling and enable a computer to indicate to the switching device to switch the fuel supply from alternative oil to petrochemical diesel until a load is placed on the engine again, to avoid wet stacking of the glycerin-containing alternative oil.

In one embodiment, the system can receive another indication by the computer to stop operation of the alternative oil system and switch to petrochemical diesel-only mode of operation because of an increase in vacuum on the output of the heated filter 114. Such an increase in vacuum will arise when the filter becomes restricted; the vacuum on the engine side of heated filter 114 will increase as lass fuel is able to pass through the restricted filter. A vacuum sensor on the engine side heated filter 114 can optionally signal to the computer the vacuum reading and thus, enabling the computer to gauge when an excessive vacuum exists, thereby indicating that heated fitter 114 is restricted. A vacuum sensor can optionally signal to the computer when heated filter 114 is beginning to clog and thus enable the computer either to signal a warning of an impending restriction of heated fuel filter 114 to the operator or to indicate to the switching device a switch from the alternative oil to the petrodiesel fuel supply should be performed.

The arrangement of filters and heaters in the example of FIG. 1 are intended to illustrate an example of a suitable system; those skilled in the art will appreciate that other types of filters and heaters, other placement of filters end heaters, and various heater and filter technologies are suitable for particular applications (e.g., suitable for particular engines, climates, or use patterns).

The example system of FIG. 1 can be used, or adapted to be used, with a variety of diesel engines, and diesel engines with fuel rails for example, including but not limited to use with contemporary direct injection engines.

First fuel heater 102 can comprise any of a variety of fuel heating approaches; for example, an in-line electric heater can be used to allow higher heating than might be obtained from engine coolant, and to allow precise control (e.g., by computer) of the heating characteristics. Alternative oil exiting the first fuel heater can optionally be heated to over 120 degrees Fahrenheit, as an example. An electric heater of about 10 amps to about 40 amps can be suitable for some diesel engines used in contemporary vehicles.

In one embodiment, first fuel heater 102 can optionally be an in-line electric heater of less than about 20 amps capacity to place less of a demand an the engine and vehicle's electrical output. To ensure safety, preventing the in-line electric heater from heating the alternative oil to a temperature higher than the lowest flash-point of alternative all, 825 degrees Fahrenheit, such an in-line electric heater can optionally include a self limiting thermostat so that the heater does not operate at a temperature of higher than about 250 to about 324 degrees Fahrenheit. Additional features of such an in-line electric heater, which improve its effectiveness as a heat exchange device, have to do with its size and the shape of the metal surface area it exposes to the alternative oil. The passage for alternative oil inside the in-line electric heater can optionally have a greater cross-sectional area than the supply lines, allowing the alternative oil to flow more slowly through the in-line electric heater and thus, increase heat absorption. The metal cylinder forming the passage for alternative oil can optionally contain and/or be attached to an internal metal structure, such as a honeycomb or a three or more multi-armed or multi-pronged cross, to expose more of the alternative oil passing through the in-line electric heater to heat-conducting metal, thus increasing heat absorption.

In one embodiment, valves 103, 104, 105 can comprise any of a variety of fluid control devices suitable for connecting one port to either of two other ports. For example, three-way valves commercially available from manufacturers such as Hydraforce can be suitable. The valves can be electrically controllable to allow for precise control of the valves' operation (e.g., by a computer), and can be sized such that they accommodate the required fuel flow rates. The valves can be mounted relative to the engine such that volume of fuel in the fuel lines between the valves and the engine is as small as practical, which can reduce the volume of alternative oil that must be purged in the purge mode of operation.

In one embodiment, first, second and third valves 103, 104 and 105 can optionally be combined into a single manifold, thus allowing for substantially the entire manifold to be heated and for fewer connections to be required, increasing reliability and reducing heat loss. A single manifold containing three valves will preferably reduce the number of fuel line connections from about nine to about six. The reduced heat loss can result from the elimination of external plumbing running between separate valves, increased heat gain comes from heating the single manifold by any of several ways, such as by having coolant pass through passageways built into the manifold.

First filter 106 can be a conventional filter designed for petrochemical diesel. Mounting first filter 106 between the petrochemical diesel fuel tank 108 and first valve 103 ensures that alternative oil will not traverse first filter 106, which can be important if first filter 106 is not compatible with alternative oil (e.g., if alternative oil prematurely clogs the first filter 106).

Second fuel heater 107, like first fuel heater 102, can comprise any of a variety of fuel heating methods. Since the fuel in this embodiment is preferably further heated by first fuel heater 102, precise control and high temperature of second fuel heater 107 can be less important than with first fuel heater 102. This can allow coolant-heated approaches to be used, thereby reducing the cost and complexity of the system. As an example, a flat plate heat exchanger like those commercially available from manufacturers such as Kaori, can be suitable.

Heated filter 114 can also be coolant-heated. Various apparatuses can be suitable, including a variety of combinations of conventional filters with coolant-heated bodies or wraps. Heated pickup 113 can optionally be used to lower the viscosity of the alternative oil in alternative oil tank 109 sufficient to allow it to be drawn through the system. A variety of heated pickup apparatuses can be suitable, including models commercially available from Arctic Fox (generally intended for use with petrochemical diesel fuel in cold climates).

Petrochemical diesel fuel tank 108 can be a conventional diesel fuel tank. Alternative oil tank 109 can comprise commercially available tanks. Tanks made from plastic, aluminum, stainless steel or other materials can be suitable to reduce problems that can arise from alternative oil interaction with some materials. Heat loss through alternative ell tank 109 can increase the demands on the heaters in the system, so an insulated tank or a plastic tank, instead of metal, can be beneficial.

In one embodiment, the metal head of heated filter 114 and metal valves 103, 104, 105, whether installed separately or combined into a single manifold, can be anodized to improve their ruggedness and durability by protecting them from exposure to the full range of weather conditions.

Figure 3:
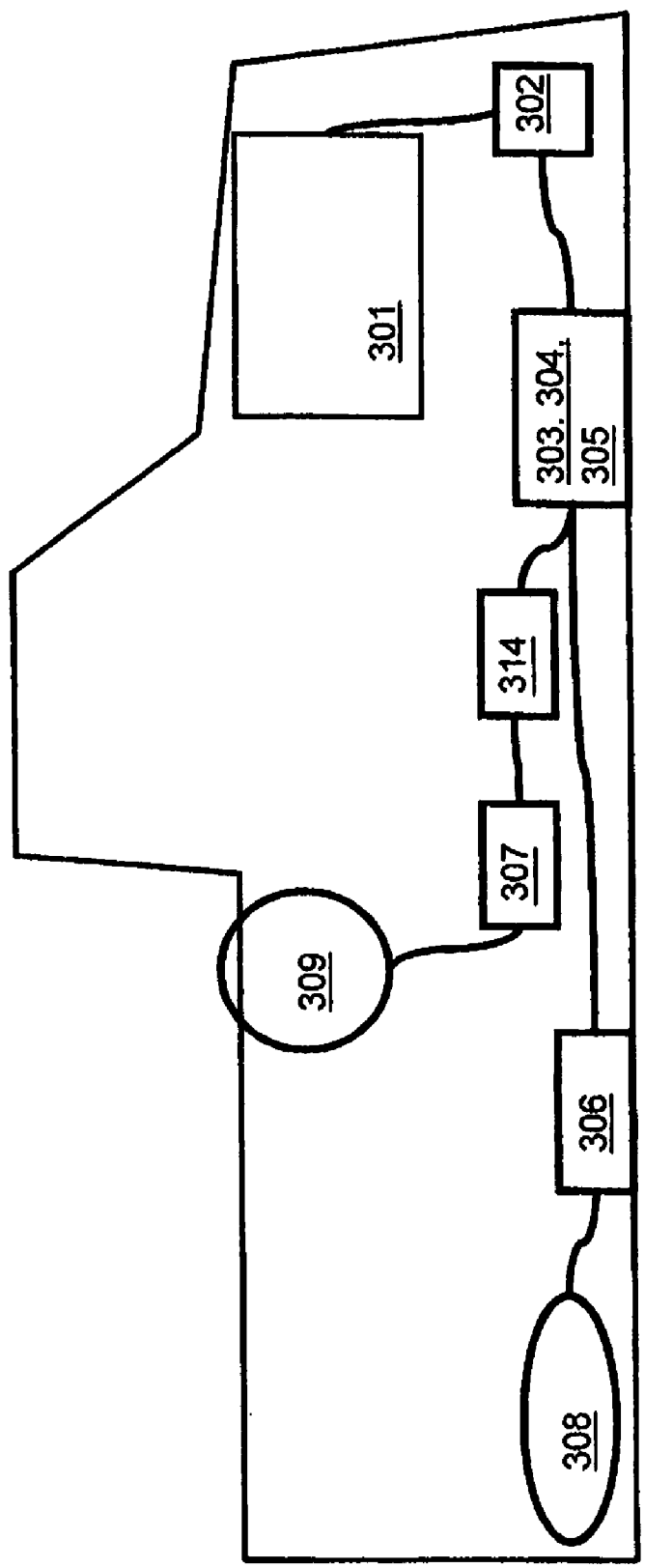
FIG. 3 is a schematic illustration of an example embodiment of the present invention as applied to a contemporary truck.

FIG. 3 is a schematic illustration of an example system according to the present invention, suitable for use in a conventional petrochemical diesel-powered vehicle, which can include, but of course is not limited to, a 1996 Ford F350 with a 7.3 L Powerstroke diesel engine (T444E). In one embodiment, conventional petrochemical diesel fuel tank 308 and filter 306 are mounted as in the original vehicle. Alternative oil tank 309, such as an 80 gallon aluminum tank, can be mounted with the vehicle, e.g., in the bed of a truck. An Arctic Fox Hot Fox heated pickup (not shown) can be mounted in tank 309. Fuel filter 314 and heat exchanger 307, which can optionally be a Kaori 16 plate heat exchanger, preferably form a fuel path from alternative oil tank 309 to valves 303, 304, 305, which can optionally be SV10 Hydraforce valves, configured as described in the example of FIG. 1. In-line electric heater 302 preferably mounts between the valve sat and the engine. An electrical control system, such as the VO Control System from VO Control Systems, (not shown) accepts input from sensors and controls the heaters and valves substantially as described in relation to the example of FIG. 1.

Figure 4:
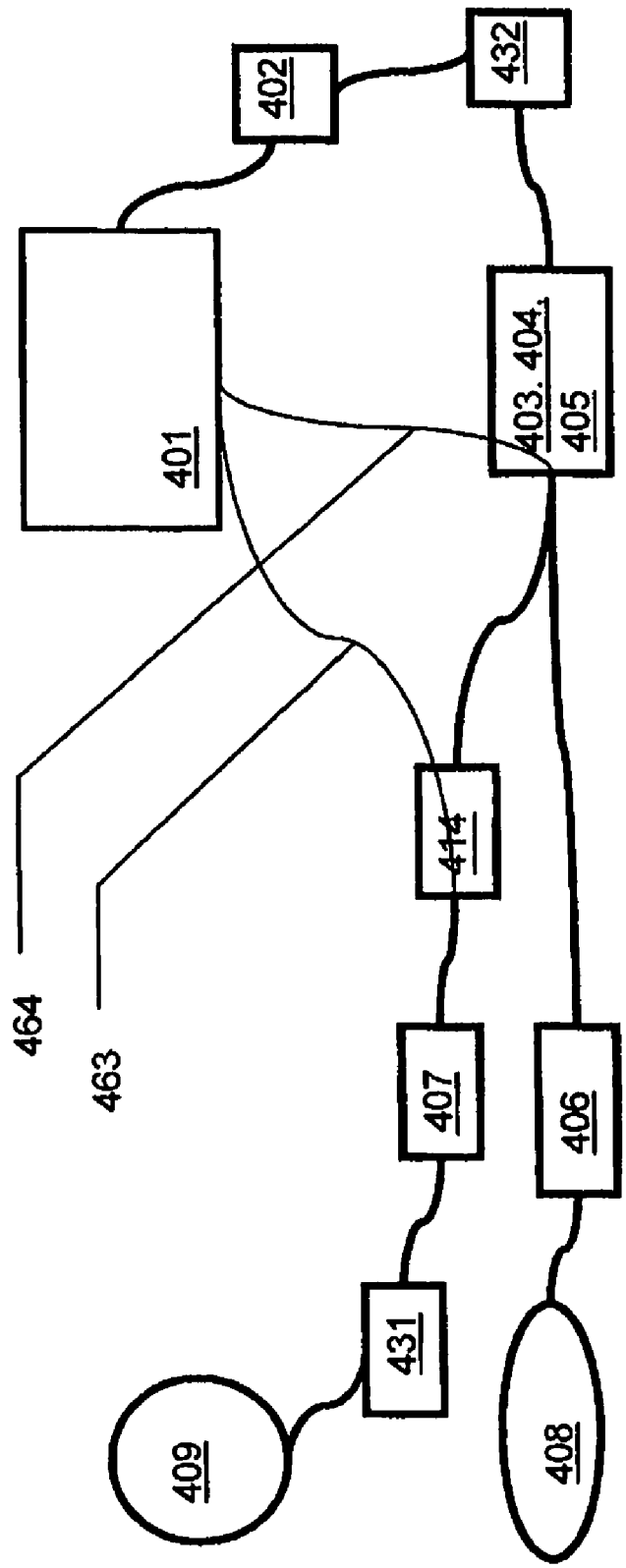
FIG. 4 is a schematic illustration of an example embodiment of the present invention as applied to a stationary diesel engine.

FIG. 4 is a schematic illustration of an example system according to an embodiment of the present invention, suitable for use with stationary diesel engines such as those found on many construction and industrial sites. Conventional petrochemical diesel fuel tank 408 and filter 406 can optionally be used. Alternative oil tank 409 can have a heated pickup (not shown) if needed for the climate and operating environment. Fuel pump 431 can be used near alternative oil tank 409 to facilitate supply of the relatively viscous alternative oil through the system. Heated filter 414 and heat exchanger 407 preferably mount in the fuel path from fuel pump 431 to a set of three valves 403, 404, 405, connected substantially as described in the example of FIG. 1. Normal fuel pump 432 for the engine and fuel heater 402 preferably provide fuel to engine 401. Return fuel from the engine can be supplied to heat exchanger 407 or to valve set 403, 404, 405, depending on whether fuel returned from the engine is hotter than fuel output from heat exchanger 407. In one embodiment, the system can operate substantially as described in connection with the example of FIG. 1. Alternative oil systems have previously used a fuel tank with vertically-mounted heated fuel pickups like the "Hot Fox" model, commercially available for use with petrochemical diesel in cold climates. Electrical, coolant, or exhaust heating can be used with the heated pickup to heat the fuel in the tank. Alternative oil, however, can reach a semi-solid state in cool conditions, and a vertically-mounted heated pickup can heat the oil near the pickup, which is then pumped to the engine, leaving an air gap between the heated pickup and the still solid oil in the rest of the tank, thereby choking the engine from its fuel supply. The present invention can include a fuel tank with a heated pickup installed as shown in FIG. 5a. Fuel tank 501 preferably has heated pickup 513 installed horizontally. Heated pickup 513 can have fuel line 514 configured to reach near the bottom of the tank to enhance the usable capacity of tank 501. Heated pickup 513 can be supported by support 515, reducing the stress on the side wall of tank 501 that can lead to failure or leaks. Heated pickup 513 can preferably heat the oil nearby, and, as that oil is pumped to the engine, heat convection (rising in the tank) encourages heating of oil above the pickup, and gravity transports oil to heated pickup 513 to replace the oil that has been pumped to the engine. Although heated pickup 513 is illustrated in the figure as a rectangle; it can, of course, have any of a variety of shapes, e.g., a coil mounted near the bottom of the tank, or heat passages formed into the tank itself, or a shape mounted with the top of the tank, and having a section configured to extend along a portion of the tank near the bottom.

Figure 5B:
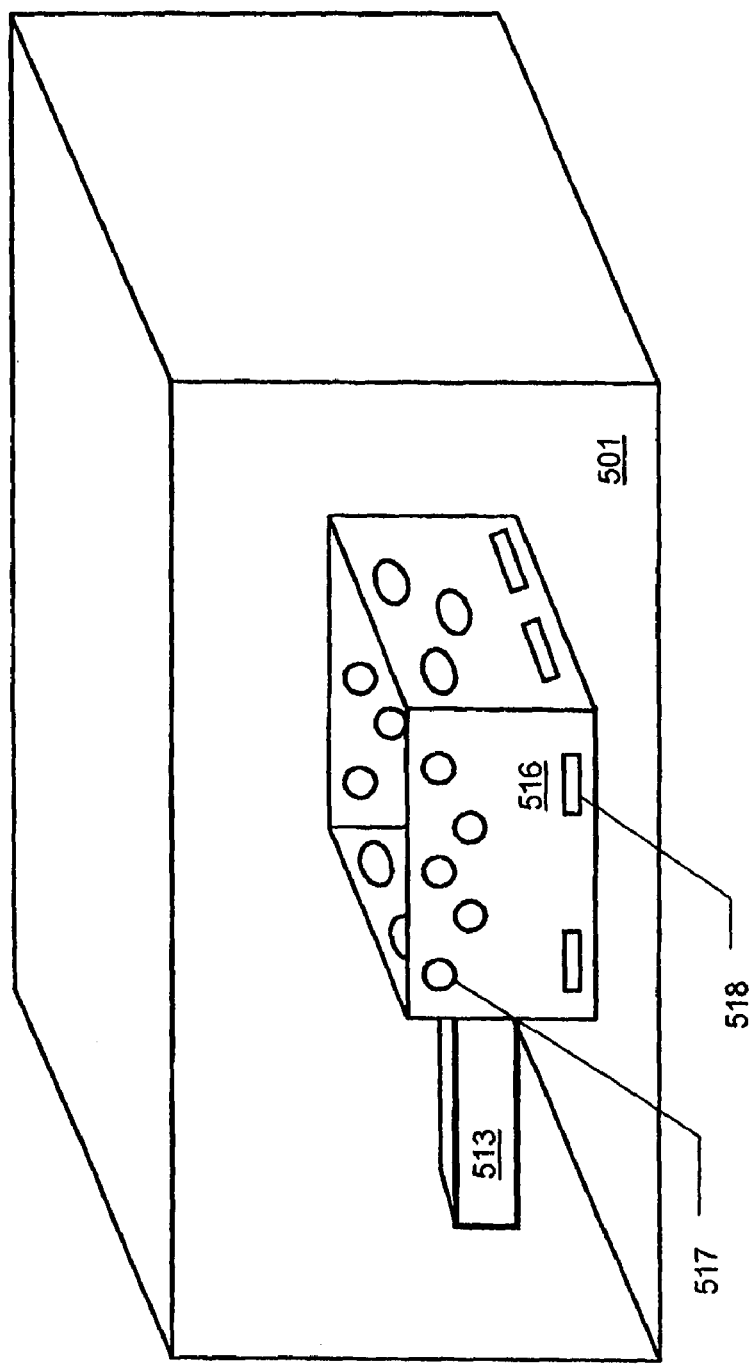

Air gaps in the fuel supply to an engine can cause many problems. An embodiment of the present invention can also provide a cage to surround the fuel pickup to support the pickup and to allow fuel motion (useful in ensuring full tank utilization and thorough fuel heating) while discouraging fuel motion that could lead to air gaps. A schematic depletion of an example cage is illustrated in FIG. 5b. Cage 516, which functions as a baffle, preferably mounts with the bottom of tank 501. Of course other baffle designs which permit gradual fuel flow and which reduce fuel sloshing can be used in place of cage 516 and will provide desirable results. For example a single plate disposed within and substantially dividing the tank, but which has a small opening at a bottom thereof to allow the gradual flow of fuel between the two so divided sections of the tank provides particularly desirable results.

Heated pickup 513 preferably mounts with the side of the tank (or top with a suitably shaped pickup, as described above), and extends into cage 516. Cage 616 preferably has a height less than the interior height of tank 501 to allow free fuel motion when the fuel level in tank 501 is higher than the height of cage 516. A plurality of openings 517 in the upper portion of cage 516 preferably allow fuel motion into cage 516 as the fuel level in tank 501 is preferably less than the height of cage 516, but dampen fuel motion away from the pickup in the cage, for example as might occur when a vehicle is turning or operating on a slope. Second plurality of openings 518 near (in the figure) or at the bottom of cage 516 preferably perform similar functions when the fuel level in the tank is near the bottom. Second plurality of openings 516 can be shaped such that fuel damping is greater than with first plurality of openings 517, since when the fuel level is very low the risk of air in the heated pickup can be greater. The alternative oil tank 109 and/or 501 and a flat plate heat exchanger, whether used as first fuel heater 102 or second fuel heater 107, can preferably be spray-insulated with a material such as Smith's Ultimate Lining, Line-X, or Rhino Linings to maximize the conservation of heat within the alternative all system and provide a more consistent baseline temperature to allow for more precise temperature control of the alternative oil.

Figure 6:
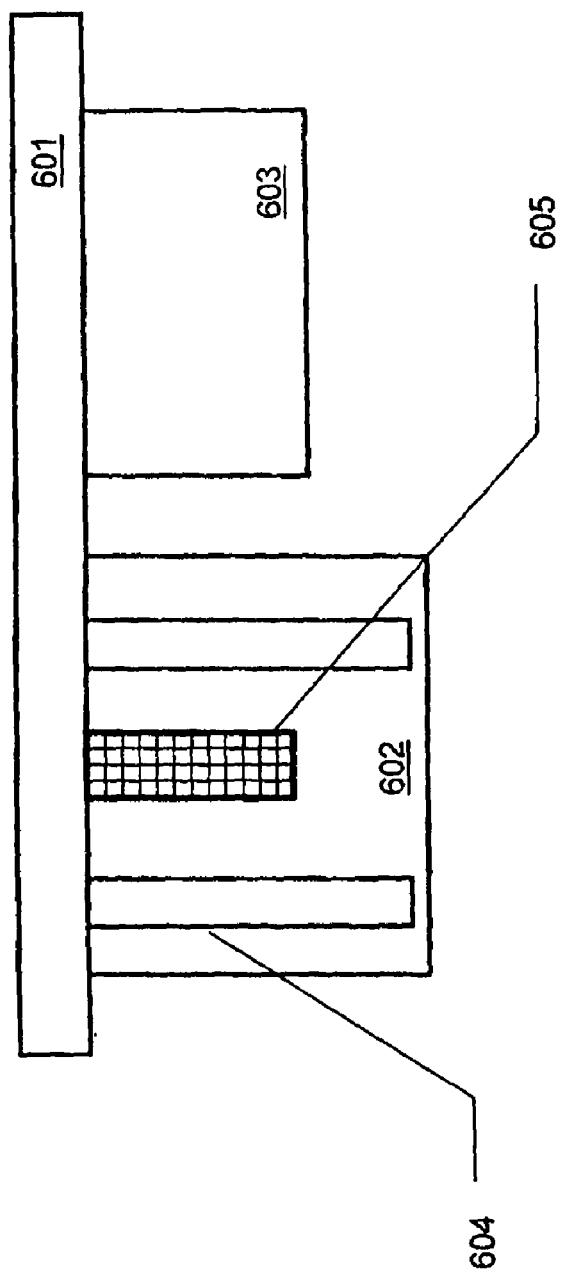
FIG. 6 is a schematic illustration of a heated fuel filter system suitable for use with some embodiments of the present invention.

FIG. 6 is a schematic illustration of a heated filter system suitable for use in some embodiments of the present invention. The system preferably comprises manifold 601 having fuel passages and a heating mechanism (e.g., coolant passages, electrical heating elements, or exhaust gas passages). Bowl 602 mounts with manifold 601, and accepts fuel from manifold 601 and returns fuel to manifold 601 after passing through strainer filter 605. One or more heat conductive elements 604 are preferably in thermal communication with manifold 601 and conduct heat into the fuel in bowl 602, thus discouraging solidification or excessive viscosity that can occur when alternative oil is allowed to cool. Heat conductive elements 604 can, as examples, comprise metal rods (solid or with coolant passages), electrically heated elements, or the like. Conventional barrier filter 803 can also be mounted with manifold 801 to achieve more complete filtering of the fuel. Coolant passages in manifold 601 can be shaped to provide a desired coolant dwell time in the manifold and consequent heat transfer performance; for example, the passages in the manifold can have a greater cross-sectional area than the supply lines, allowing the coolant to flow more slowly in the manifold and achieve desired heat transfer characteristics.

Figure 7:
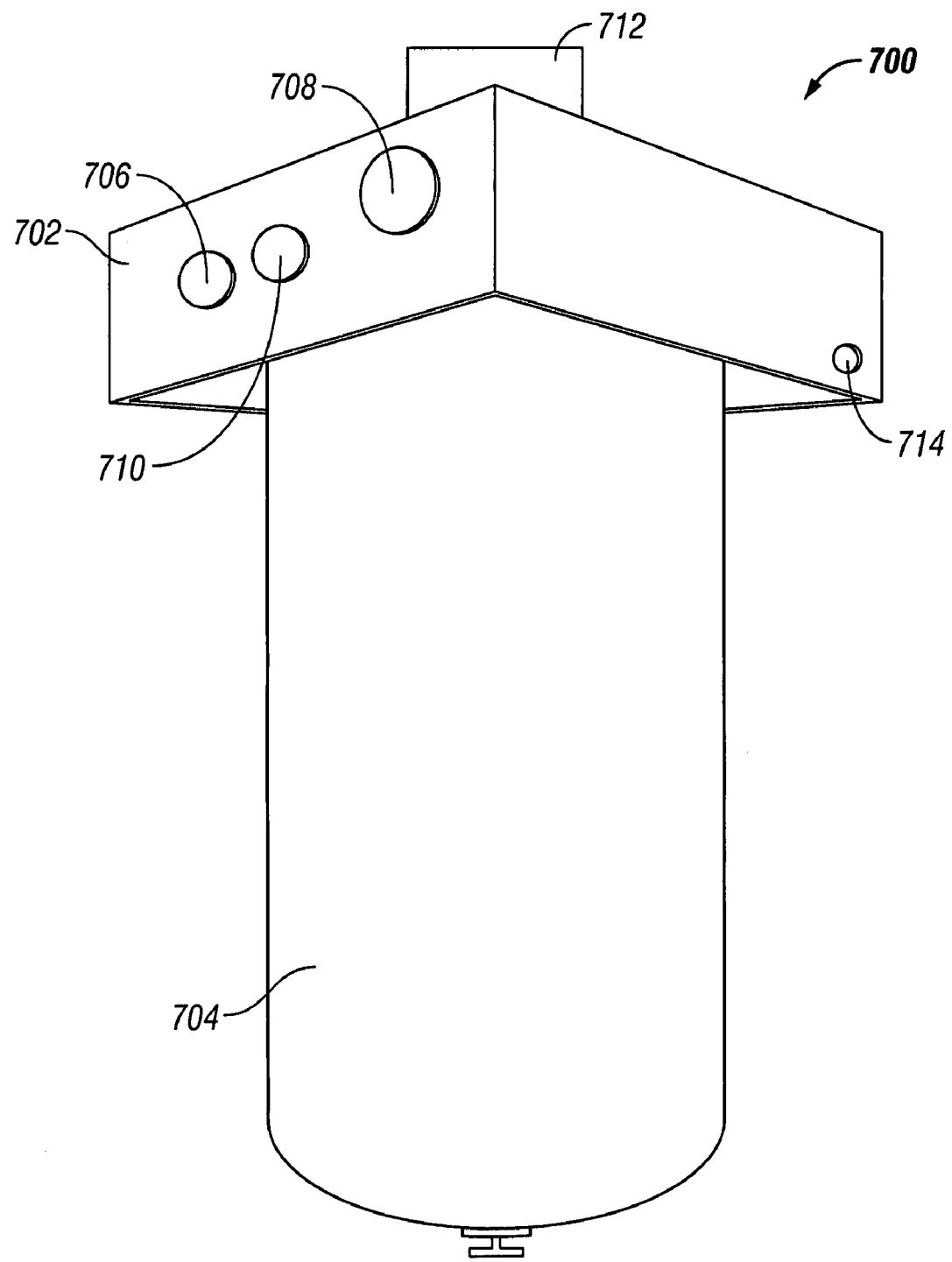
FIG. 7 is a perspective view drawing illustrating a heated fuel filter according to an embodiment of the present invention.
Figure 8A:
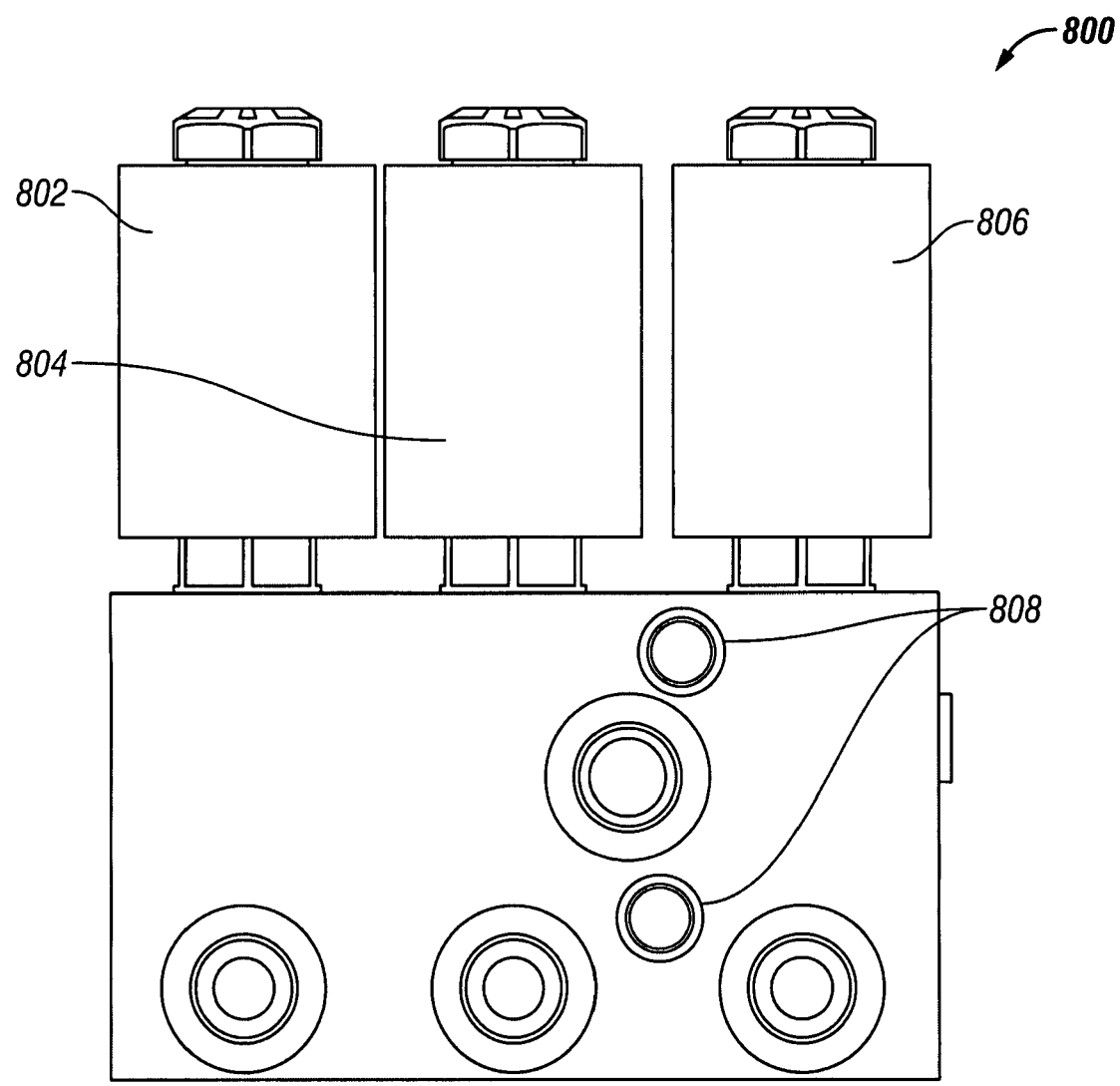
FIGS. 8a-8d are front, back, top, and end views of a heated fuel valve manifold according to an embodiment of the present invention.
Figure 8B:
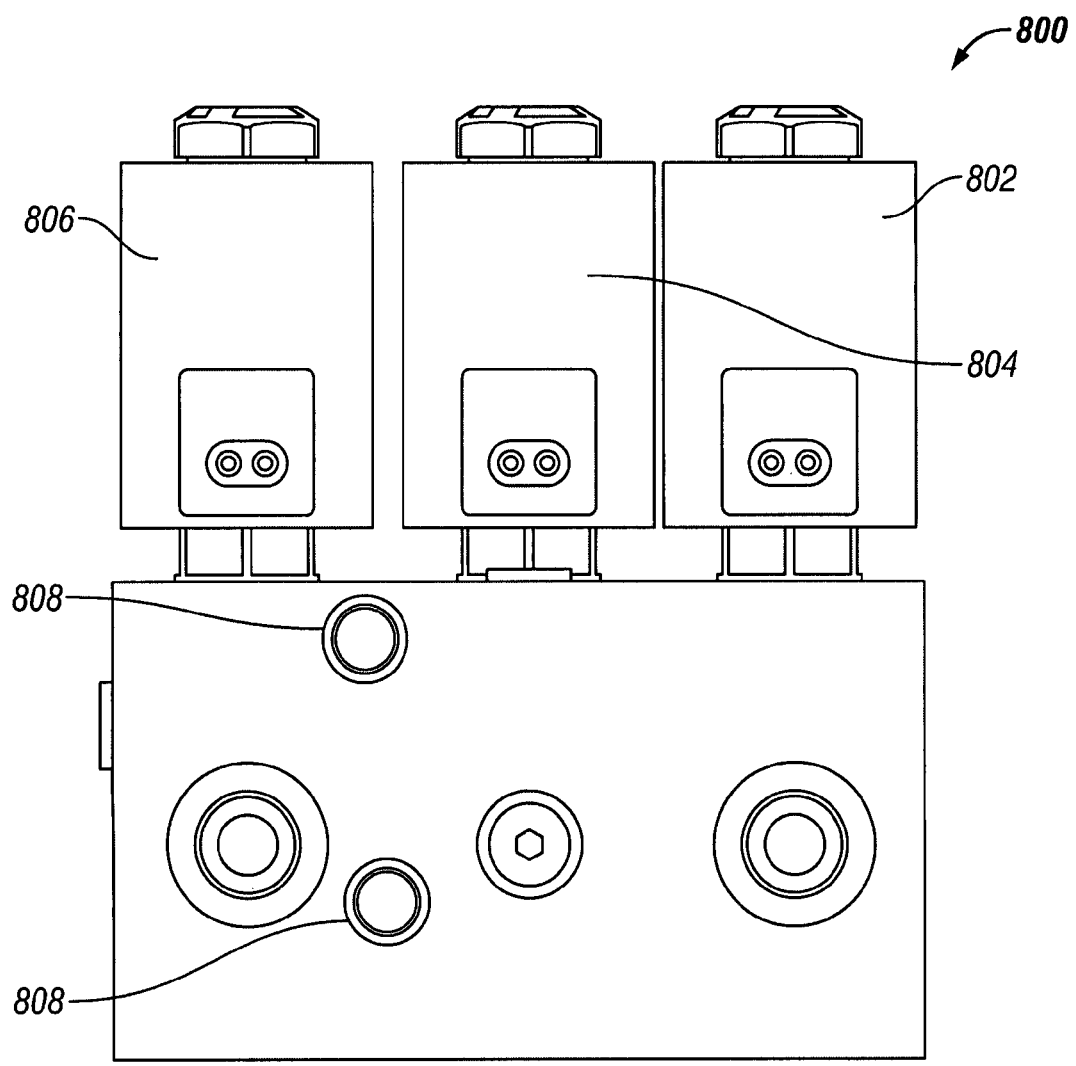
Figure 8C:
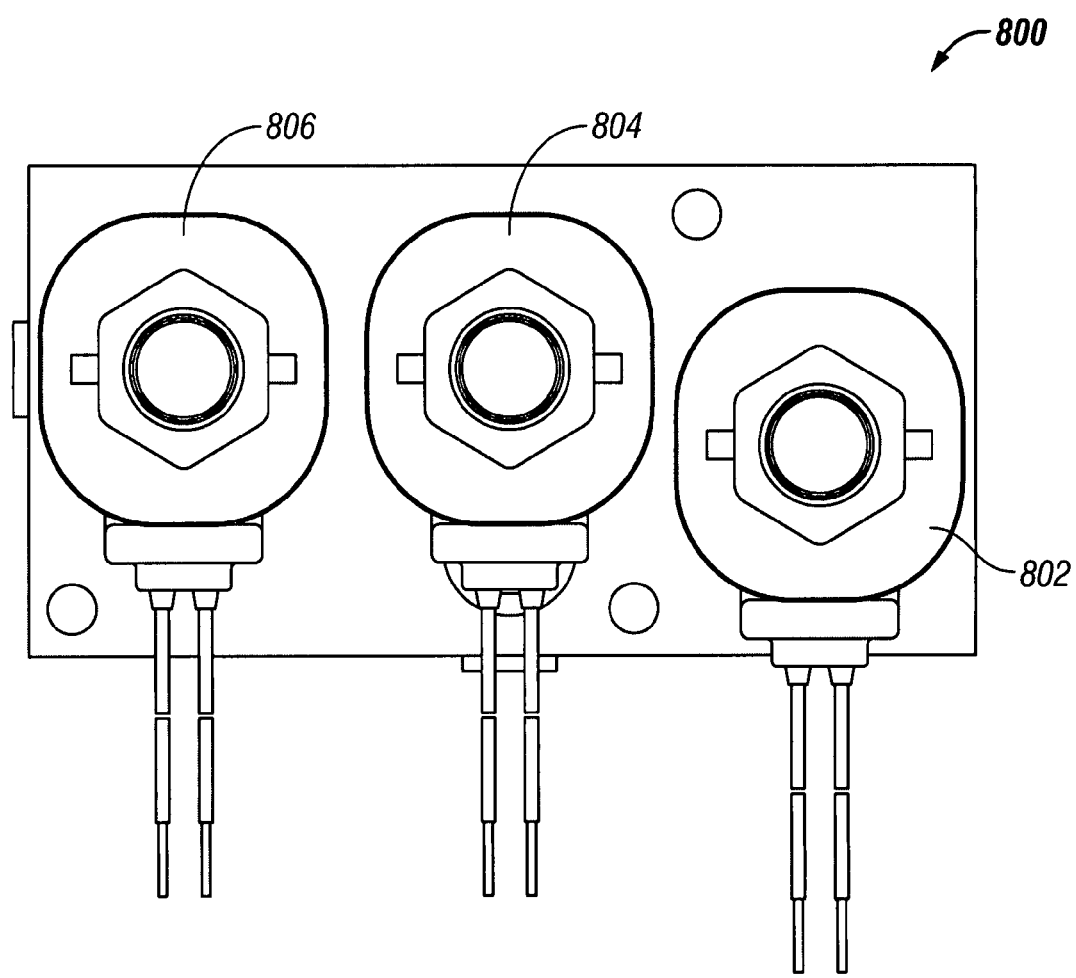
Figure 8D:
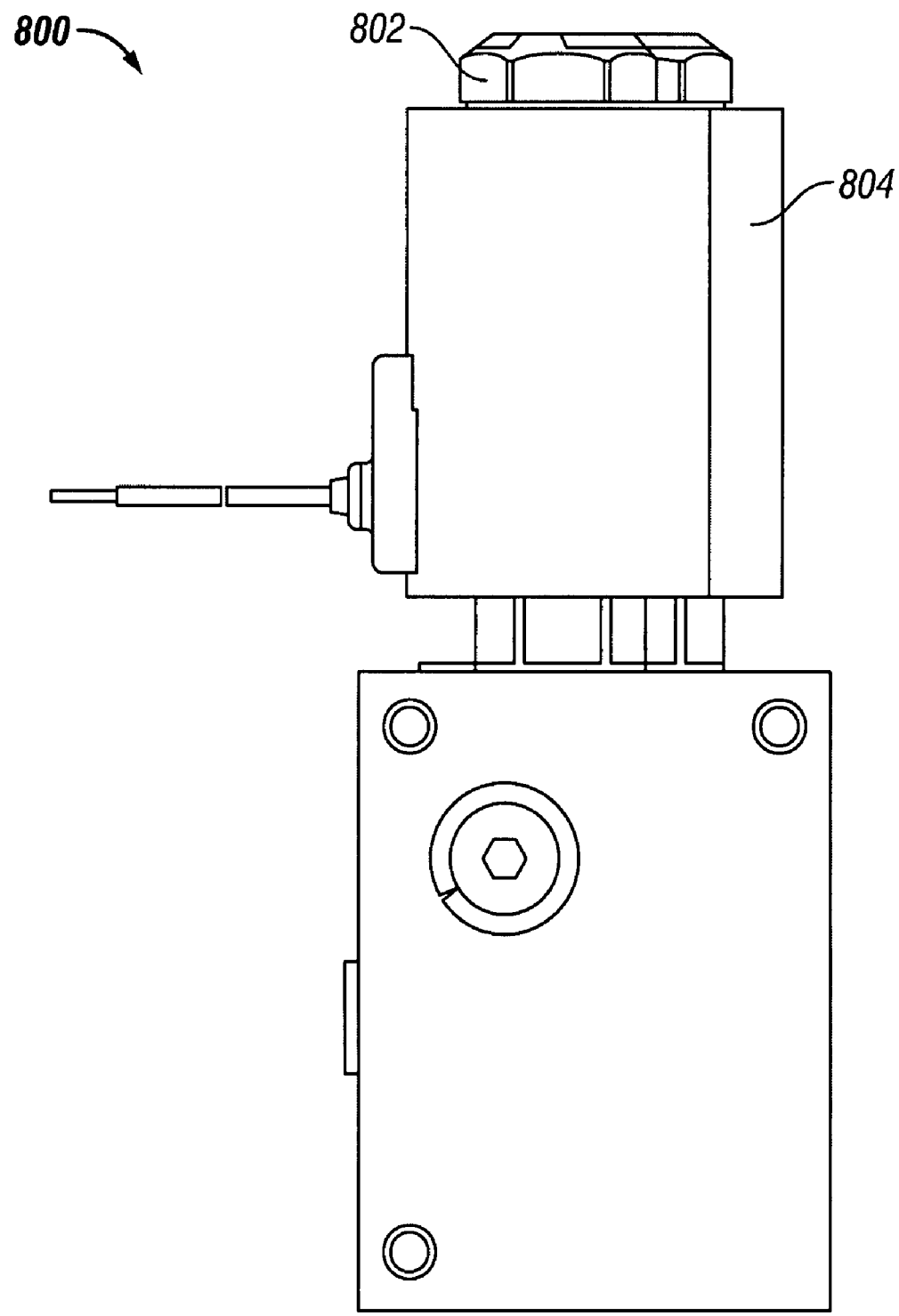
Figure 8E:
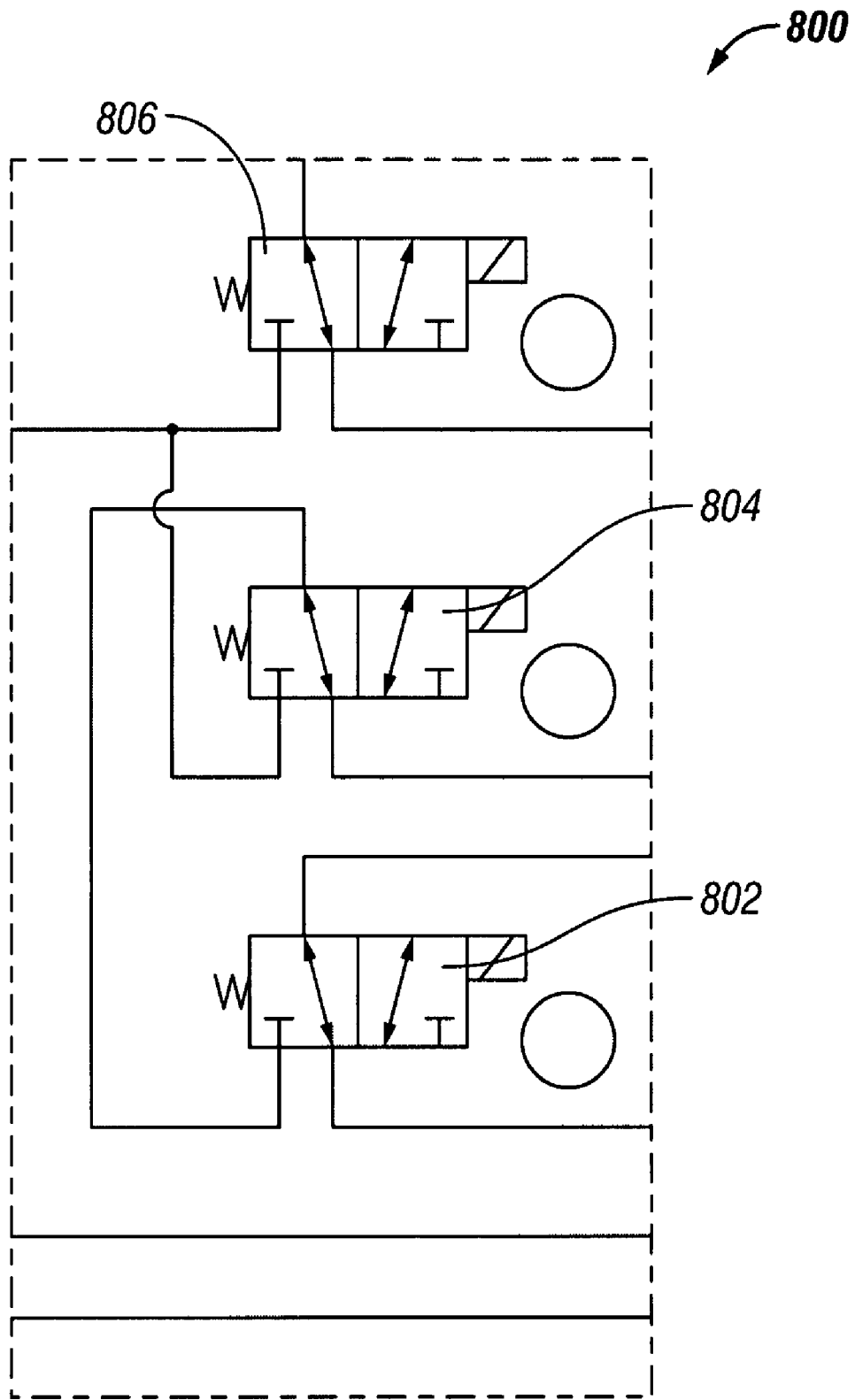
FIG. 8e is a drawing which schematically illustrates the valve manifold of FIGS. 8a-8d.

In an alternative embodiment of the present invention as illustrated in FIG. 7, the present invention can comprise and/ or otherwise use heated filter assembly 700. In this embodiment, filter assembly 700 preferably comprises filter head 702 and filter 704. Filter head 702 preferably has first and second coolant passages 706 and 708, through which heated engine coolant is preferably caused to flow the entire distance across filter head 702 before exiting on an opposite side from which it entered. Fuel passage 710 is preferably disposed between first and second coolant passages 706 and 708 such that a substantial heating effect is provided to fuel passing through fuel passage 710. Although not essential, coolant passages 706 and 708 most preferably traverse the entire length of filter head 702, such that a substantial amount of heat transfer can occur. In one embodiment, engine coolant is preferably allowed to flow through coolant passages 706 and 708, thereby heating fuel disposed within fuel passage 710 to a temperature of greater than about 120 degrees Fahrenheit, and more preferably to a temperature of greater than about 120 degrees Fahrenheit, and most preferably to a temperature of greater than about 140 degrees Fahrenheit.

In one embodiment, filter head 702 can also optionally comprise electrical heater 712 disposed thereon which is preferably wired such that it is activated when a user activates an engine block heater. While desirable results can be obtained when either an outgoing or a return coolant line is spilt into two different flow paths and thus caused to flow through coolant passages 706 and 708, in a preferred embodiment, an outgoing coolant flow path is directed through one of coolant passages 706 or 708 and the return coolant line is directed to the other coolant passage.

In one embodiment, filter head 702 also preferably comprises vacuum port 714 which is preferably connected to a pressure sensor such that when a pump is configured to draw fuel through filter 704.

In one embodiment, a pump can draw fuel through filter 704 by producing an at least partial vacuum, thereby sucking fuel through the filter. If filter 704 becomes restricted, a partial vacuum is thus created at vacuum port 714 and the partial vacuum is detected by the pressure sensor, such that a user can be made aware of a restricted filter that should be replaced, before the filter becomes too restricted to pass an adequate amount of fuel to the engine.

As illustrated in FIGS. 8a-8e, an embodiment of the present invention comprises and/or otherwise uses heated fuel valve manifold 800 which preferably comprises valves 802, 804, and 808, which are preferably electrically activated solenoid valves used together as a selector switch to switch between alternative oil and petrochemical diesel fuel. In a preferred embodiment, one or more passages 808 are preferably provided in manifold 800 through which heated engine coolant is caused to flow. By providing manifold 800 for all three valves, numerous internal connections are thus provided, thereby reducing not only installation time and complications, but also reducing the number of external connections required, thus greatly reducing the number of possible leaky connections which could otherwise occur by manually connecting the three valves together without manifold 800. While the most preferred embodiment of the present invention uses three valves, desirable results can be obtained with two or more valves joined by manifold 800. FIGS. 8a-8d illustrate various passages for the flow of alternative oil and/ or petrochemical diesel fuel, which fuel can be selected between. The various connections of these passageways to other components of other embodiments of the present invention will be understood by those skilled in the art, particularly upon studying the schematic diagram of FIG. 8e. By providing internal passages 808 for the flow of heated engine coolant, the valves of the invention are thus capable of operating even in extremely cold temperatures with alternative oils that would otherwise be solid at such temperatures if a heating effect was not provided from the heated engine coolant passing through manifold 800. In one embodiment, valves 802, 804, and 806 correspond to valves 103, 104, and 105 of a previously-described embodiment of the present invention.

Figure 9:
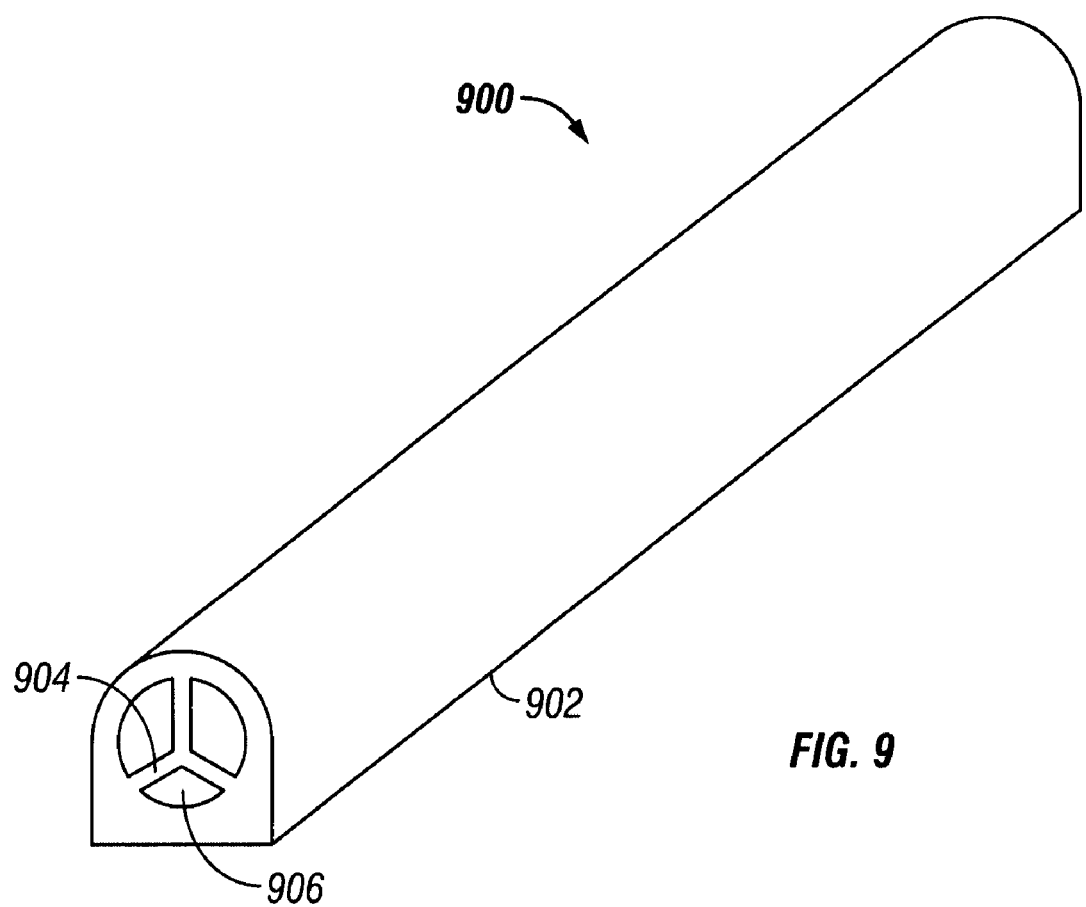
FIG. 9 is a perspective view drawing which schematically illustrates an embodiment of an in-line fuel heater according to an embodiment of the present invention.

An embodiment of the present invention relates to an in-line heater, and/or the use thereof, as illustrated in FIG. 9. As illustrated therein, in-line electric heater body 900 preferably comprises flat portion 902 at which an electric heating element preferably attaches. As those skilled in the art will readily appreciate, other types of heating elements including but not limited to a passage for heated engine coolant can be attached in place of an electrically-powered heating element and will provide desirable results. In a most preferred embodiment, heater body 900 preferably comprises internal extrusion 904 which is formed internally within fuel passage way 906. Extrusion 904 provides an increased surface area for fuel flowing through passage way 906 to contact and thus be heated. In a preferred embodiment, heater body 900 preferably comprises a single continuous extruded piece of material which is thermally conductive and which is chemically compatible with alternative oil. Heater body 900 is most preferably made from a stainless steel, aluminum, or an aluminum alloy. In one embodiment, the in-line heater of the present invention is configured to heat alternative oil to a temperature of at least about 100 degrees, mare preferably to a temperature of greater than about 120 degrees. In a preferred embodiment, heater body 900 is preferably threaded on an outside diameter of fuel passageway 906 such that a maximum diameter of fuel flow line is maintained through the heater.

In one embodiment of the present invention, the alternative oil of the present invention comprises at least 60% animal fats and/or oils, and more preferably at least 70% animal fats and/or oils. Optionally, various fuel flow components for the alternative oil can be housed within enclosure 115 (see FIG. 1), thus permitting quick and easy installation and/or replacement of the assembly. In addition, enclosure 115 helps to prevent heat dissipation and thus enables the alternative oil to be easily maintained in a liquid state at very cold temperatures. For example, in one embodiment, valves, fuel pump, petrochemical diesel and alternative oil filters, and connecting flow lines are housed within single enclosure 115, which is most preferably disposed on a vehicle in a position which permits easy access thereto.

In a preferred embodiment, the present invention relates to a method for supplying alternative oil to an engine, particularly to a compassion-combustion engine. The method includes providing a tank for storing alternative oil and providing an alternative oil heated filter through which the alternative oil is most preferably drawn by sucking. The method also includes selecting between fuel sources for the engine which sources include alternative oil and petrochemical diesel.

Another embodiment of the present invention relates to a compression-combustion fuel supply system for supplying alternative fuel to a compression-combustion engine which system includes a system for supplying petrochemical fuel and a storage tank for storage of alternative oil. The storage tank most preferably includes a heated pickup. The system also preferably includes a heated alternative oil filter and a pump that is configured to selectively pump either petrochemical fuel or alternative oil.

Figure 10:
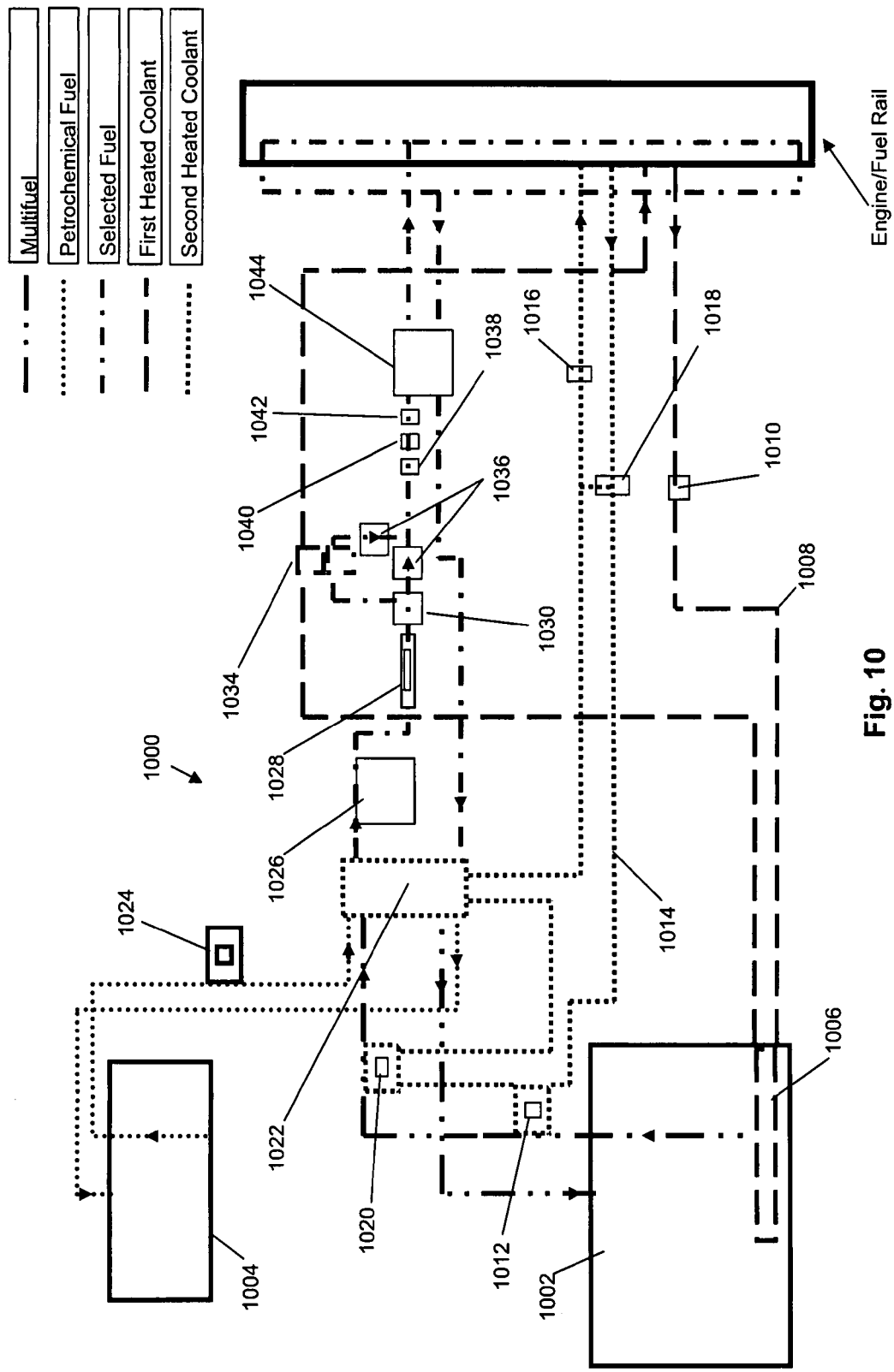
FIG. 10 is a schematic drawing illustrating an embodiment of the present invention wherein multiple types of fuels can be supplied to an engine from a single fuel tank.

FIG. 10 illustrates an embodiment of the present invention wherein multifuel system 1000 has multifuel tank 1002 and petrochemical fuel tank 1004. In this embodiment, multifuel tank 1002 can optionally be provided with an alternative oil or a petrochemical fuel, such as diesel. Multifuel tank 1002 is preferably provided with heated fuel pickup 1006 which is most preferably horizontally disposed within tank 1002. While heated fuel pickup 1006 can be heated from any known heat source, including electrically generated heat, pickup 1006 is most preferably heated from heated engine coolant line 1008, which most preferably is controlled by control valve 1010.

Multifuel which flows from tank 1002 preferably passes through heater 1012 which prevents the multifuel from becoming a solid when the outside ambient temperature is cool or cold. Heater 1012 is most preferably a flat plate heat exchanger. Although heat exchanger 1012 can optionally be heated with the same branch of coolant flow line 1008, heat exchanger 1012 is most preferably heated with an alternate branch of flow line 1014. In this embodiment, the temperature of coolant traveling through heated engine coolant flow line 1014 is preferably monitored by temperature sensor 1016. In addition, valve 1018, which is most preferably a three-way valve is preferably used to send heated coolant through flat plate heat exchanger 1012, fuel filter 1020, and valve manifold 1022; or valve 1018 can optionally be activated to bypass all of these devices and simply circulate heated coolant back to the engine.

After multifuel passes through heat exchanger 1012, it preferably passes through filter 1020, which is most preferably heated by coolant flow line 1014 as previously described. After passing through heated filter 1020, multifuel then preferably enters valve manifold 1022, which operation is consistent with previously-described manifold 601.

Fuel from petrochemical fuel tank 1004 preferably passes through filter 1024 before entering manifold 1022. Fuel pump 1020 is preferably disposed after manifold 1022 such that fuel pump 1026 draws by sucking fuel through filters 1020 and/or 1024. The selected fuel, drawn from either multifuel tank 1006 or petrochemical fuel tank 1004, depending upon the selection based on the condition of valves within manifold 1022 then preferably passes through heater 1028, which is most preferably an electric in-line heater, before passing through three-way fuel diverter valve 1030. In one activation/deactivation state of diverter valve 1030, the selected fuel preferably passes through fuel diverter valve 1030 and then, dependent on the particular engine type, enters main fuel injector pump 1044 or directly enters the engine, in the alternative deactivation/activation state of diverter valve 1030, fuel preferably travels through fuel cooling heat exchanger 1034. In this embodiment, fuel cooling heat exchanger 1028 preferably cools the fuel traveling therethrough by transferring heat to air, but can also optionally be heated, at least to some extent, by heat flowing through coolant loop lines 1008. Optionally, one or more check valves 1036 can be provided to prevent the selected fuel from mixing with fuel of a different temperature contained in a different branch of the selected fuel circuit. After the selected fuel exits either the cooling heat exchanger 1034 or diverter valve 1030, it then preferably passes by a plurality of sensors which can optionally include, in no particular order, fuel pressure sensor 1038, fuel temperature sensor 1040, and/or high limit fuel temperature sensor 1042.

In operation, system 1000 functions substantially similar to that described in earlier embodiments of the present invention, except that because petrochemical fuel, such as diesel, can be stored in the multifuel tank 1002, provisions have been made in this embodiment to prevent such fuel from being overheated prior to entering the engine. For example, in this embodiment, if the selected fuel is determined to be too hot and thus exceeds a predetermined amount as indicated by high limit fuel temperature sensor 1042, which can optionally be a fuel inlet high limit probe, is a safety mechanism and preferably a snap-acting switch mechanism which is set to a trigger at a temperature which is near, but below the maximum fuel temperature for a given engine. Valve 1010 is preferably closed thereby stopping the flow of heated engine coolant in heated fuel pickup 1006 and fuel cooling heat exchanger 1034. In addition, valve 1030 is preferably activated so as to cause selected fuel to pass through fuel cooling heat exchanger 1034. Because cooling fuel heat exchanger 1034 most preferably comprises a radiator-type of configuration which enables air at ambient temperature to pass therethrough, the cessation of flow of heated engine coolant through it thus permits an excessive temperature of the selected fuel to be reduced through a heat transfer to the ambient temperature air, thereby bringing the temperature of the selected fuel back into an appropriate temperature range.

High limit temperature sensor 1042 detects when the selected fuel is back in an appropriate temperature range and causes valve 1010 to again open, thus permitting heated coolant to again flow, and causes valve 1030 to be activated such that selected fuel again bypasses fuel cooling heat exchanger 1034.

Fuel temperature sensor 1040, preferably detects when the temperature of the selected fuel is too low and causes valve 4016 to be activated such that heated engine coolant is allowed to heat flat plate heat exchanger 1012, filter 1020, and valve manifold 1022. Fuel temperature sensor 1040 can also be used to activate heater 1028 when the fuel temperature is below a predetermined amount.

Fuel pressure sensor 1038 preferably detects when a drop in fuel pressure occurs. Because such a drop in pressure is often indicative of an alternative fuel that has cooled and thus begun to gel and clog the flow lines, presser sensor 1038 thus causes valves in manifold to activate such that the selected fuel is instead being drawn from petrochemical fuel tank 1004.

Figure 11A:
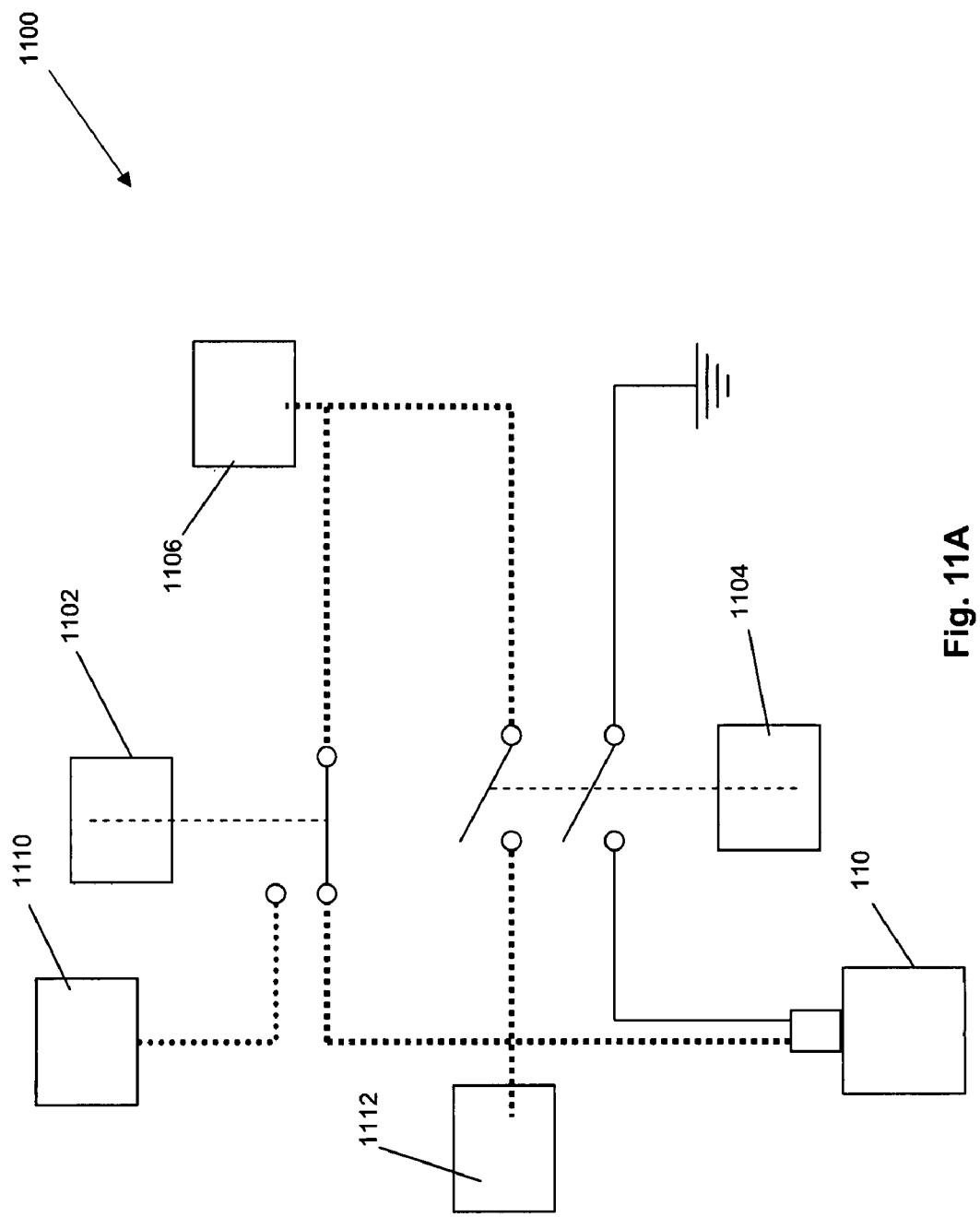
FIGS. 11A and 11B are schematic drawings which respectively illustrate a primary heat loop control circuit and a high limit circuit according to an embodiment of the present invention.

FIG. 11A is a schematic drawing which illustrates primary heat loop control circuit 1100 according to an embodiment of the present invention. Circuit 1100 preferably has in-line heater relay 1102 which is most preferably a single pole, double throw relay. Circuit 1100, also preferably has control ignition relay 1104 which is most preferably a double pole, single throw relay. As illustrated therein voltage source 1106, which can be a 12 volt direct current source is preferably connected to through the normally closed contact of relay 1102 to a lead of primary heat control valve 1108, the other lead of primary control valve 1108 preferably connects to ground through the first pole of the normally open contact of relay 1104. In addition, voltage source 1106 preferably connects to inline heater 1110 via the normally open contact of relay 1102. Voltage source 1106 also preferably connects to ignition hold lead 1112 for the engine through the second pole of the normally open contact of relay 1104.

Figure 11B:
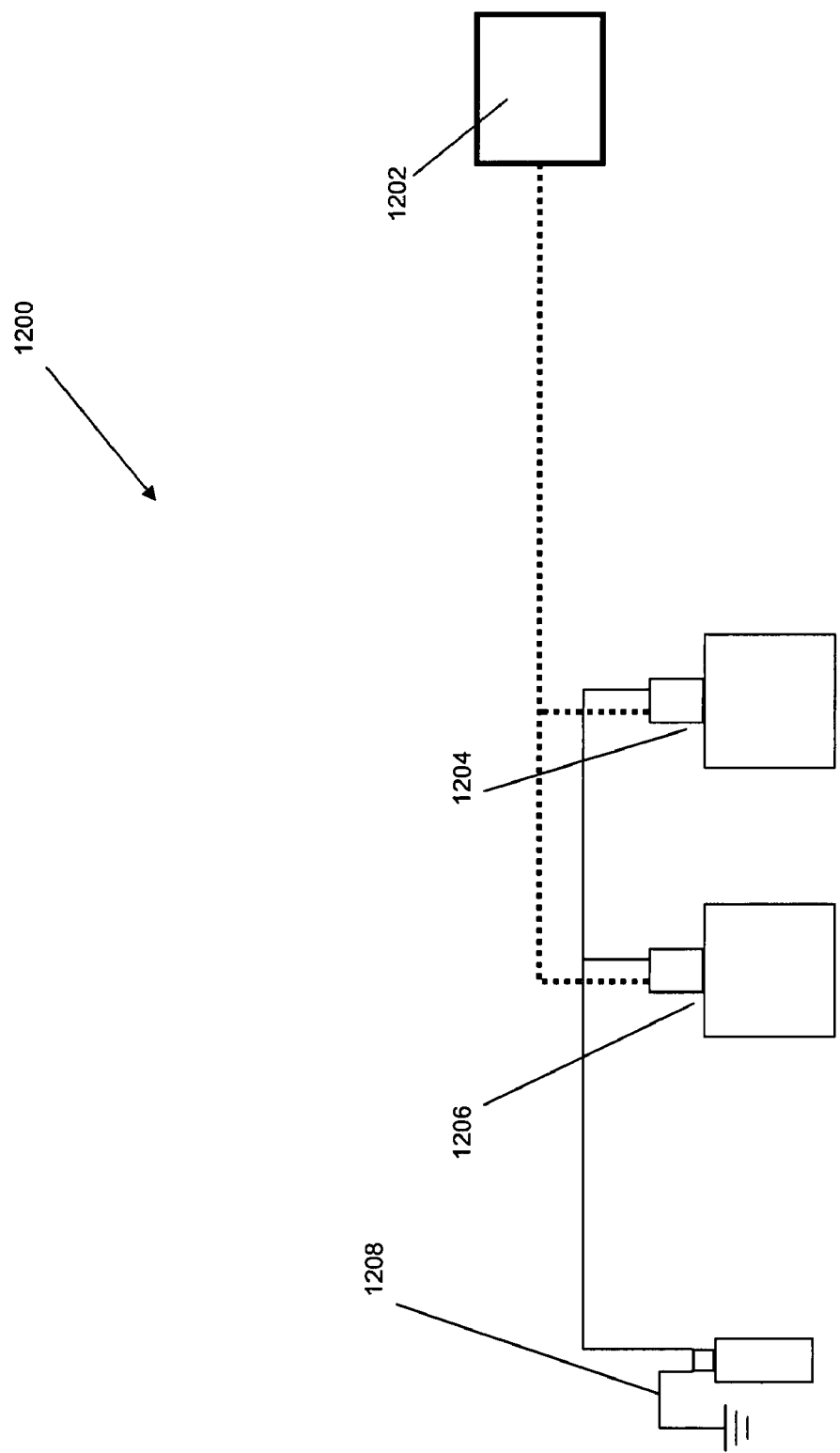

FIG. 11B is a schematic drawing which illustrates high limit circuit 1200 according to an embodiment of the present invention. As illustrated therein, voltage source 1202, which can be a 12 volt direct current source, preferably connects to a voltage supply lead for each fuel diverter valve 1204, and tank heat loop control valve 1206. Fuel inlet high limit probe 1208, or an equivalent logic circuit which utilizes a temperature sensor, preferably connects the ground leads of valves 1204 and 1206 to ground, thereby activating the valves when an excessive fuel temperature is sensed.

The particular sizes and equipment discussed above are cited merely to illustrate particular embodiments of the invention. The use of the invention can involve components having different sizes and characteristics.

INDUSTRIAL APPLICABILITY

The invention is further illustrated by the following non-limiting example.

Example 1

Alternative oil was used in a Ford F-450 truck with the teachings of an embodiment of the present invention. The following are results of an engine crankcase oil test for that truck, which was powered by the alternative oil and which tests were performed at 1,000 miles after the normal service interval of 5,000 miles. The test results indicated that no corrective action is required and that the oil is suitable for continued use.

CUSTOMER NO.: 319950
UNIT NO.: 1998-FORD
DESCRIPTION: DIESEL ENGINE
END USER: FORREST
END USER LOCATION: RIO RANCHO, NM 87124
MAKE: FORD
MODEL: E-450
OIL BRAND: AMSOIL
OIL TYPE: 15W40
SERIAL NO.: 1996
FUEL TYPE: DIESEL
SPECTROCHEMICAL ANALYSIS (ppm):
Iron 37, Chromium 3, Lead 49, Copper 11, Tin 0, Aluminum 8, Nickel 5, Silver 0, Silicon 6, Boron 4, Sodium 45, Magnesium 37, Calcium 3921, Barium 0, Phosphorus 1312, Zinc 1486, Molybdenum 0, Titanium 0, Vanadium 0, Potassium 0.
Physical Properties:
Fuel (1% VOL)<1; VIS@40 C cSt; N/A; VIS@ 100 C cSt 12.49; WATER (% VOL) 0; SOOT/SOLIDS (% WT) 0.1; and COOLANT NO.

The preceding example can be repeated with similar success by substituting the generically or specifically described components and/or operating conditions of this invention for those used in the preceding example.

What is claimed is:

1. A method for supplying alternative oil to an engine, the system comprising:
   providing a supply line extending from an alternative oil storage tank to an alternative oil heated filter, from the alternative oil filter to a first valve, and from the first valve to the engine;
   selecting the alternative oil using the first valve;
   providing an alternative oil operating loop extending from the engine to a second valve, from the second valve to a third valve, from the third valve to the first valve, and from the first valve to the engine; and
   pumping the alternative oil through the alternative oil heated filter and the supply line,
   wherein each one of the first, second, and third valves is capable of being operated independently of other ones of the valves.

2. The method of claim 1, further comprising thermally insulating the alternative oil storage tank.

3. The method of claim 1, when the engine is operating only on the alternative oil, the third valve is switched to require the alternative oil to be returned to the engine via the alternative oil operating loop.

4. The method of claim 1, further comprising heating the supply line between the storage tank and the alternative oil heated filter.

5. The method of claim 1, wherein the fuel pump is a single fuel pump and the pump selectively pumps petrochemical diesel or the alternative oil to the engine.

6. The method of claim 1, further comprising using a temperature sensor for obtaining a temperature reading of engine coolant which is returning to the engine from heating one or more heated alternative oil components.

7. The method of claim 1 further comprising pumping petrochemical diesel from a diesel tank through a path that bypasses the alternative oil heated filter.

8. The method of claim 1, further comprising providing a time delay prior to engine shut down.

9. The method of claim 8 wherein during the time delay petrochemical diesel replaces the alternative oil in a portion of the supply line.

10. The method of claim 1 further comprising a time delay occurring prior to switching from a supply of the alternative oil to a supply of petrochemical diesel fuel.

11. The method of claim 1 further comprising disposing engine coolant lines within a portion of the alternative oil heated filter.

12. The method of claim 11, wherein at least a portion of the engine coolant lines which are disposed within a portion of the alternate oil heated filter comprise a greater cross-sectional area than that of a portion of the coolant lines which connect to the alternative oil heated filter.

13. The method of claim 1, further comprising providing a heater in the alternative oil storage tank.

14. The method of claim 13, further comprising longitudinally orientating the heater in the alternative oil storage tank.

15. The method of claim 1, wherein one or more or the valves in the alternative oil operating loop is a heated valve.

16. The method of claim 15, further comprising heating for the first valve by engine coolant which has been heated by the engine.

17. The method of claim 1, wherein the first, second and third valves of the heated valve assembly are disposed in a common case.

18. A fuel supply system for a compression-combustion engine, comprising:
a petrochemical fuel tank for storing petrochemical fuel;
an alternative oil storage tank for storing alternative oil;
a first valve, a second valve, and a third valve,
a petrochemical fuel supply line extending from the petrochemical fuel tank to the first valve, and from the first valve to the engine;
an alternative oil supply line extending from the alternative oil storage tank to the first valve and from the first valve to the engine;
an alternative oil purge line extending from the engine to the second valve, from the second valve to the third valve, and from the third valve to the alternative oil storage tank;
an alternative oil operating loop extending from the engine through a portion of the alternative oil purge line to the second valve, from the second valve to the third valve, from the third valve to the first valve, and from the first valve to the engine, and
a pump configured such that it can be used to selectively pump either the petrochemical fuel or the alternative oil.

19. The fuel supply system of claim 18, further comprising a heat exchanger in the alternative oil supply line between the first valve and the engine for cooling the alternative oil.

20. The fuel supply system of claim 18, further comprising:
a heated alternative oil filter disposed in the alternative oil supply line between the alternative oil tank to the first valve.

21. The fuel system of claim 18, wherein the first, second, and third valves are disposed in a common case, and each one of the first, second, and third valves is capable of being operated independently of other ones of the valves.

22. The fuel system of claim 18, wherein the alternative oil storage tank is provided with a heater which is longitudinally oriented therein.

23. A fuel supply system for an engine comprising:
a petrochemical supply line connected to a petrochemical storage tank which stores petrochemical fuel;
a multifuel supply line connected to a multifuel storage tank which stores multifuel;
a heated valve assembly connected to each of the supply lines for selectively switching between fuel stored in said multifuel and said petrochemical storage tanks; and
a fuel cooling heat exchanger in a fuel input path extending between the multifuel tank and the engine for selectively cooling the fuel prior to the fuel being supplied to the engine.

24. The system of claim 23 further comprising a maximum fuel temperature sensor for measuring a temperature of the multifuel.

25. The fuel supply system of claim 23, wherein the multifuel stored in said multifuel storage tank optionally includes the petrochemical fuel.

26. The fuel supply system of claim 23, further comprising a first heated engine coolant loop for heating the heated valve assembly,
wherein the heated valve assembly includes first, second and third valves disposed in a common case,
wherein each one of the first, second, and third valves is capable of being operated independently of other ones of the valves.

27. The fuel supply system of claim 23, further comprising first and second engine coolant loops for heating the multifuel.

28. The fuel supply system of claim 26 wherein said first heated engine coolant loop includes a three-way valve causing the heated engine coolant to bypass the heated valve assembly.

29. The fuel supply system of claim 23 further comprising a diverter valve in the fuel input path between the heated valve assembly and the fuel cooling heat exchanger which selectively sends at least a portion of the fuel in the fuel input path through said fuel cooling heat exchanger, or which causes the fuel in the fuel input path to bypass said fuel cooling heat exchanger prior to the fuel being supplied to the engine.

* * * * *